(12) United States Patent
Lee et al.

(10) Patent No.: US 11,039,298 B2
(45) Date of Patent: Jun. 15, 2021

(54) METHOD AND APPARATUS FOR REMOTELY PROVIDING PROFILE IN COMMUNICATION SYSTEM

(71) Applicant: Samsung Electronics Co., Ltd., Suwon-si (KR)

(72) Inventors: Hye-Won Lee, Seoul (KR); Jong-Han Park, Bucheon-si (KR); Duc-Key Lee, Seoul (KR); Sang-Soo Lee, Yongin-si (KR); Song-Yean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 15/766,679

(22) PCT Filed: Oct. 6, 2016

(86) PCT No.: PCT/KR2016/011210
§ 371 (c)(1),
(2) Date: Apr. 6, 2018

(87) PCT Pub. No.: WO2017/061800
PCT Pub. Date: Apr. 13, 2017

(65) Prior Publication Data
US 2018/0302781 A1  Oct. 18, 2018

(30) Foreign Application Priority Data

Oct. 7, 2015  (KR) .......................... 10-2015-0141249

(51) Int. Cl.
*H04W 8/20* (2009.01)
*H04W 12/06* (2021.01)
(Continued)

(52) U.S. Cl.
CPC ........... *H04W 8/20* (2013.01); *H04W 12/069* (2021.01); *H04W 80/12* (2013.01); *H04W 8/18* (2013.01)

(58) Field of Classification Search
CPC ....... H04W 12/06; H04W 80/12; H04W 8/18; H04W 8/20
See application file for complete search history.

(56) References Cited

U.S. PATENT DOCUMENTS

| 9,009,475 B2 | 4/2015 | Hauck et al. |
| 10,242,210 B2 | 3/2019 | Girard et al. |

(Continued)

FOREIGN PATENT DOCUMENTS

| CN | 103329578 A | 9/2013 |
| EP | 2 925 032 A1 | 9/2015 |

(Continued)

OTHER PUBLICATIONS

Indonesian Office Action dated Apr. 20, 2020, issued in Indonesian Patent Application No. P-00201803055.

(Continued)

*Primary Examiner* — Kevin C. Harper
*Assistant Examiner* — Derrick V Rose
(74) *Attorney, Agent, or Firm* — Jefferson IP Law, LLP

(57) ABSTRACT

The present invention relates to an efficient method and apparatus for remotely providing/downloading a profile for use in a communication service in a communication system, and the method for downloading the profile in the communication system, according to one embodiment of the present invention, comprises the steps of: transmitting, to a first server, first information for processing a request for downloading a profile; receiving, from the first server, address information of a second server processing the request for downloading the profile on the basis of the first information;

(Continued)

transmitting, to the second server, second information for calling a function, of an application, related to the downloading of the profile; receiving, from the second server, the profile-related information as a response of the second information for calling the function; and connecting to a third server providing the profile on the basis of the profile-related information, and downloading the profile.

18 Claims, 16 Drawing Sheets

(51) Int. Cl.
*H04W 80/12* (2009.01)
*H04W 12/069* (2021.01)
*H04W 8/18* (2009.01)

(56) References Cited

U.S. PATENT DOCUMENTS

| | | | |
|---|---|---|---|
| 2002/0156903 A1* | 10/2002 | Bach Corneliussen | H04L 63/0227 709/228 |
| 2006/0079284 A1 | 4/2006 | Lu et al. | |
| 2011/0081950 A1 | 4/2011 | Guven | |
| 2012/0190354 A1 | 7/2012 | Merrien et al. | |
| 2013/0067026 A1* | 3/2013 | Hershko | H04L 61/106 709/217 |
| 2014/0031012 A1 | 1/2014 | Park et al. | |
| 2015/0110028 A1 | 4/2015 | Wu | |
| 2016/0127132 A1 | 5/2016 | Lee et al. | |
| 2016/0262021 A1* | 9/2016 | Lee | H04L 63/083 |
| 2016/0283216 A1* | 9/2016 | Gao | H04W 8/20 |
| 2016/0316356 A1* | 10/2016 | Li | H04W 8/205 |

FOREIGN PATENT DOCUMENTS

| | | |
|---|---|---|
| KR | 10-2013-0097798 A | 9/2013 |
| KR | 10-2013-0132295 A | 12/2013 |
| WO | 2014/193181 A1 | 12/2014 |

OTHER PUBLICATIONS

Chinese Office Action dated Jul. 3, 2020, issued in Chinese Patent Application No. 201680058480.4.
Indian Office Action dated Mar. 9, 2021, issued in Indian Application No. 201837008504.
Chinese Office Action dated Mar. 25, 2021, issued in Chinese Application No. 201680058480.4.

* cited by examiner

METHOD AND APPARATUS FOR REMOTELY PROVIDING PROFILE IN COMMUNICATION SYSTEM

PRIORITY

This application is a U.S. National Stage application under 35 U.S.C. § 371 of an International application number PCT/KR2016/011210, filed on Oct. 6, 2016, which is based on and claimed priority of a Korean patent application number 10-2015-0141249, filed on Oct. 7, 2015, in the Korean Intellectual Property Office, the disclosure of which is incorporated by reference herein in its entirety.

TECHNICAL FIELD

The present disclosure generally relates to a method and apparatus for providing, to a UE, a profile for a communication service provision, in a communication system.

BACKGROUND ART

The Internet has evolved from a human-centered connection network in which humans create and consume information, into the Internet of Things (IoT) network in which distributed components such as things may exchange and process information. For example, in the Internet of Everything (IoE), Big Data processing technology is combined by the connection to a cloud server and the like with IoT technology.

In order to implement IoT, technologies such as a sensing technology, a wired/wireless communication and a network infrastructure, a service interfacing technology, and a security technology are required, and recently, technologies for sensor network, Machine to Machine (M2M) communication, and Machine Type Communication (MTC) for connection between things are being studied.

Such an IoT environment may provide intelligent Internet Technology (IT) services that bring new value to human life by collecting and analyzing data generated among connected things. IoT may be applied to fields including smart homes, smart buildings, smart cities, smart cars or connected cars, smart grid, health care, smart home appliances and advanced medical services by convergence and combination between existing Information Technologies (IT) and various industrial applications.

In a wireless communication system, a User Equipment (UE) may use a voice communication service or a data communication service in a designated position or during movement by connecting to a wireless communication network. At this time, in order to provide a communication service to the UE, a suitable authentication process is necessary. Generally, a Universal Integrated Circuit Card (UICC) is inserted into a UE, and an authentication between the UE and a server of a communication operator (e.g., a Mobile Network Operator: MNO) is performed by a Universal Subscriber Identity Module (USIM) installed in the UICC. In a case of a Global System for Mobile communication (GSM) method, the UICC is also referred to as a Subscriber Identity Module (SIM) card, and in a case of a Wideband Code Division Multiple Access (WCDMA) or a Long Term Evolution (LTE) method, the UICC is also referred to as a Universal Subscriber Identity Module (USIM) card.

When a user of a UE subscribes a wireless communication service provided from the communication operator, the communication operator provides a UICC to the user. When the user inserts the provided UICC into the UE of the user, after a USIM application installed in UICC performs a suitable authentication process with a server of the communication operator in which the same value is stored, using an International Mobile Subscriber Identity (IMSI) value stored in the UICC and a K value which is an encryption key for an authentication, the UE may use a communication service. An example of the suitable authentication process may include an Authentication and Key Agreement (AKA) authentication.

The conventional UICC is manufactured by a demand of a specific communication operator as a dedicated card for the specific mobile communication operator. Accordingly, the authentication information (e.g., USIM application and a subscriber identification ID (e.g., may include IMSI) for a network connection of a corresponding communication operator, a code key (e.g., a known K value or Ki value) is stored in the UICC in the manufacturing stage. The communication operator provides the subscriber with the manufactured UICC and, if necessary, may perform management to install, update, and delete application in the UICC by an Over The Air (OTA) technology or the like. The user may insert the UICC into a UE to use a network and an application service of the corresponding communication operator, and when UEs are changed, the user may inserts attachable and detachable UICC into new UE from the existing UE so as to use the authentication information, contacts, and phonebooks stored in the corresponding UICC with the new UE as they were.

In addition, differently from the conventional UICC which is manufactured and distributed as a dedicated UICC for a specific communication operator, a method in which a user subscribes (or buys) a communication service after the user buys or obtains a specific UICC, the user may subscribe to or be released from a specific wireless communication operator, change a subscription to another communication operator, or the like, remotely install a USIM application and a subscriber ID, an encryption key, and the like of the communication operator, and various pieces of authentication information of the communication operator is able be installed and managed securely and flexibly is being sought. For example, research for an embedded UICC in which a profile for providing a communication service may be remotely installed by a network, without changing a UICC although a user changes a communication operator is being progressed. The eUICC may be manufactured as a UICC which is mounted in a UE in advance by fixing the eUICC to the UE, for example, as a chip type in a manufacturing process of the UE. Therefore, the eUICC may be used in various UEs having a structure in which physical attachment and detachment is not easy, such as Machine to Machine (M2M) (or Device to Device (D2D)) UE as well as a normal wireless UE such as a mobile phone. The eUICC is also referred to as an enhanced SIM (eSIM).

DETAILED DESCRIPTION OF THE INVENTION

Technical Problem

According to aspects of the present disclosure, an effective method and apparatus for remotely providing/downloading a profile for use of a communication service in a communication system is provided.

In addition, according to aspects of the present disclosure, a method and apparatus for providing/downloading, based on a web, a profile for use of a communication service in a communication system is provided.

Technical Solution

In accordance with an aspect of the present disclosure, a method of downloading a profile in a communication system includes: transmitting, to a first server, first information for a download request process of the profile; receiving, based on the first information, from the first server, address information of a second server processing a download request of the profile; transmitting, to the second server, second information for a function calling of an application related to a download of the profile; receiving, from second the server, profile related information in response to the second information for the function calling; and downloading, based on the profile related information, the profile by connecting to a third server providing the profile.

In addition, in accordance with an aspect of the present disclosure, an apparatus for downloading a profile in a communication system includes: a communication interface configured to transmit and receive a signal; a Universal Integrated Circuit Card (UICC) for download and installation of the profile; and a controller configured to control to transmit, to a first server, first information for a download request process of the profile, receive, based on the first information, from the first server, address information of a second server processing a download request of the profile, transmit, to the second server, second information for a function calling of an application related to a download of the profile, receive, from the second server, profile related information in response to the second information for the function calling, and download, based on the profile related information, the profile by connecting to a third server providing the profile.

In addition, in accordance with an aspect of the present disclosure, a method of processing a download request of a profile in a communication system includes: receiving, from a UE, first information for a function calling of an application related to a download of the profile, by a first server; and transmitting, to the UE, profile related information including at least one of identification information of a second server capable of downloading the profile and identification information of the profile in response to the reception of the first information, by the first server.

In addition, in accordance with an aspect of the present disclosure, a first server processing a download request of a profile in a communication system includes: a communication interface configured to transmit and receive a signal; and a controller configured to control to receive, from a UE, first information for a function calling of an application related to a download of the profile, and transmit, to the UE, profile related information including at least one of identification information of a second server capable of downloading the profile and identification information of the profile in response to the reception of the first information.

In accordance with an aspect of the present disclosure, a method of downloading a profile in a communication system includes: inputting an address of an eSIM server in an electronic device by a user and connecting to the eSIM server by the electronic device; selecting a profile download request method by the user; replying, to the electronic device, an address of a profile download request processing server which processes a corresponding profile download request method, by the eSIM server; connecting to the profile download request processing server by the electronic device to transfer a security token and application information; calling a profile download function of the electronic device by the profile download request processing server; and connecting to a profile server by the electronic device to request and download the profile. Here, the device may include a Universal Integrated Circuit Card (UICC) or an eUICC.

The UICC may be connected to a UE by a separate interface, or may be embedded and installed in the UE in a type of the eUICC.

The selecting the profile download request method by the user among the processes may be performed prior to or simultaneously with the inputting the address of the eSIM server to the electronic device.

BRIEF DESCRIPTION OF DRAWINGS

The above and other aspects, features and advantages of the present disclosure will be more apparent from the following detailed description taken in conjunction with the accompanying drawings, in which.

MODE FOR CARRYING OUT THE INVENTION

Figure 1:
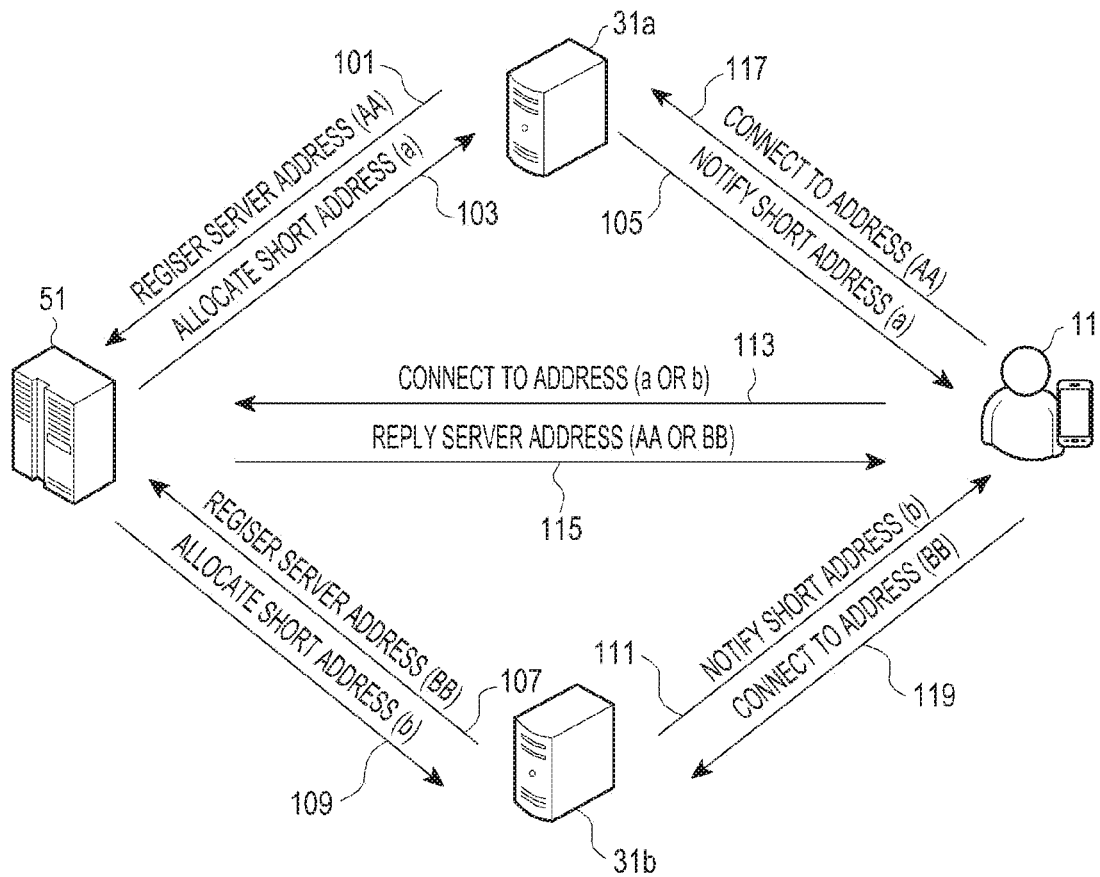
FIG. 1 is a diagram illustrating an embodiment in which a long web address (URL) is converted into a short web address in a communication system.

Hereinafter, embodiments of the present disclosure will be described in detail with reference to the accompanying drawings.

In describing the exemplary embodiments of the present disclosure, descriptions related to technical contents which are well-known in the art to which the present disclosure pertains, and are not directly associated with the present disclosure, will be omitted. Such an omission of unnecessary descriptions is intended to prevent obscuring of the main idea of the present disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the present disclosure and ways to achieve them will be apparent by making reference to embodiments as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements.

Here, it will be understood that each block of the flowchart illustrations, and combinations of blocks in the flowchart illustrations, may be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" or "module" refers to a software element or a hardware element, such as a Field Programmable Gate Array (FPGA) or an Application Specific Integrated Circuit (ASIC), which performs a predetermined function. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, the "unit" or "module" or divided into a larger number of elements, the "unit" or "module". Moreover, the elements and "units" or "modules" may be implemented to reproduce one or more CPUs within a device or a security multimedia card.

In describing the present disclosure below, a detailed description of related known configurations or functions incorporated herein will be omitted when it is determined that the detailed description thereof may unnecessarily obscure the subject matter of the present disclosure. Hereinafter, the above described embodiments of the present disclosure are specifically described with reference to the accompanying drawings.

First, terms used in the present disclosure are described. The terms used in the present disclosure may be defined according to terms used by those having ordinary skill, but in a case of an item related to an embodiment of the present disclosure, the operation or the properties may be described according to the terms used in the present disclosure.

In addition, in the present disclosure, a UICC includes an element similar to an eUICC which may remotely download a profile for use of a communication service, functionally, and may include various types of UICCs which are mounted in a UE in an attachable or detachable type, or embedded in the UE, physically.

For example, the UICC is a smart card used by being inserted into the UE, and the UICC may refer to a chip which enables secure wireless communication use by performing a subscriber authentication and a traffic security key generation when a connection to a wireless communication network, such as GSM, WDCMA, and LTE in which personal information such as network connection authentication information, a telephone directory, an SMS of a wireless communication subscriber is stored is performed. A communication application such as a Subscriber Identification Module (SIM), a Universal SIM (USIM), and an IP Multimedia SIM (ISIM) is installed in the UICC according to a type of a wireless communication network to which a subscriber is connected. In addition, the UICC may provide a high rank security function for installing various applications such as an electronic wallet, ticketing, and an electronic passport.

For example, it is assumed that the embedded UICC (eUICC) which is an example of the UICC is a security module of a chip type of which may be attached and detached may be impossible because the eUICC is embedded in the UE. However, when the eUICC is manufactured in the existing UICC type so as to be attached or detached, and a UICC capable of attaching or detaching has a same function as that of the eUICC electrically and in view of software, an embodiment of the present disclosure may be applied thereto equally.

In addition, in the present disclosure, the UICC or the eUICC may be referred to as an electronic device or a compact electronic device. Although the electronic device will be described later with reference to a corresponding drawing, the electronic device including the UICC or the eUICC may include a controller for processing a signal, and a memory for storing a profile, and in a case in which the electronic device is manufactured so as to be attached or detached to or from the UE, may include an interface unit for connecting to the UE. In addition, it is understood that a UE remotely downloading a profile includes the electronic device.

A UICC according to an embodiment of the present disclosure may download a profile using a normal IP network such as a wireless communication network or WiFi and may install the profile. Various embodiments of the present disclosure may be applied regardless of a type of a network by which the profile is downloaded.

In the present disclosure, a profile may refer to packaging at least one of an application, a file system, and an authentication key stored in the UICC, as a software type.

In the present disclosure, a USIM profile may refer to the profile or packaging information included in the USIM application in the profile, as a software type.

In the present disclosure, a profiler server may be expressed as a Subscription Manager (SM), a Subscription Manager Plus (SM+), a Subscription Manager Data Preparation (SM-DP), a Subscription Manager Data Preparation Plus (SM-DP+), a Subscription Manager Secure Routing Plus (SM-SR+), a Profile Delivery Platform, Profile Delivery Server, or the like. The profile server may be implemented internally as one or a plurality of physical server. For example, the profile server may be divided into the SM-DP server and the SM-SR+ server to be implemented internally. When the profile server verifies a credential transmitted by the UE and the verification is passed, the profile server may transmit an encrypted profile to the UE. The credential may be a credential for verifying a profile download right of the UE.

In the present disclosure, a routing server may be a server previously configured in the UE. The previously configured server may be configured when the UE is manufactured or the UE is initially operated. In addition, the previously configured server may be configured when the UE starts an operation for the profile download. The routing server may configure a routing session to transfer a communication packet for the profile download of the UE to the profile server. It should be noted that a name of the routing server in the present disclosure is merely an expression representing a function thereof and the function may be implemented in any server device having a network function.

In the present disclosure, a wireless communication network by which a message or information is transmitted or received may be a specific node of a wireless communication network. For example, the wireless communication network may be an eNB of a wireless communication network, a subscriber information management node, a mobility management node, or the like.

In the present disclosure, the wireless communication network may include a Home Location Register (HLR) and an Authentication Center (AuC) to which the UE is connected to perform a subscriber authentication function, and includes a network and a server which may provide a voice communication or a data communication by a connection after an authentication.

A term 'UE' used in the present disclosure may referred to as a Mobile Station (MS), a terminal, a User Terminal (UT), a wireless terminal, an Access Terminal (AT), a terminal, a subscriber unit, a Subscriber Station (SS), a wireless device, a wireless communication device, a Wireless Transmit/Receive Unit (WTRU), a mobile node, a mobile, or other terms. In the present disclosure, in a case in which a UE is named without a particular division, the UE may include the UICC which is inserted into the UE in a socket type, the eUICC embedded in the UE, and a software or an application (e.g., Local Profile Assistant (LPA)) installed in the UE so as to control the eUICC or UICC. In addition, the element including a corresponding UICC may be referred to as the UE in a case in which the UE is connected to the UICC by a separate communication device using a technology such as a Bluetooth SIM connection profile.

Various embodiments of the UE may include a cellular phone, a smart phone having a wireless communication function, a tablet PC having a wireless communication function, a wearable device having a wireless communication function, a personal digital assistant (PDA) having a wireless communication function, a wireless modem, a portable computer having a wireless communication function, a photographing device such as a digital camera having a wireless communication function, a gaming device having a wireless communication function, a music storing and playing appliance having a wireless communication function, an Internet home appliance capable of wireless Internet connection and browsing, and also portable units or terminals having a combination of such functions. In addition, a measuring instrument or the like having a communication function may be included in the UE.

In addition, in the present disclosure, the UE may include a Machine to Machine (M2M) UE, or a machine type communication UE/device, but the present disclosure is not limited thereto.

In the present disclosure, a profile identifier may be expressed as profile identification information, a profile ID, an Integrated Circuit Card ID (ICCID), and a factor matched with the ICCID and an Issuer Security Domain-Profile (ISD-P). For example, the profile ID may indicate a unique identifier of each profile. The profiler identifier may be used identifying the profile on a network.

In the present disclosure, the UICC identifier may be a unique identifier of the UICC for the UE, and may be expressed as a UICC identifier, an eUICC ID (EID), or the like.

Hereinafter, for convenience of description, the UICC which downloads and installs the profile is unified as the eUICC and described.

FIG. 1 is a diagram illustrating an embodiment in which a long web address (URL) is converted into a short web address in a communication system.

Referring to FIG. 1, a web address conversion service may include at least one of a web address conversion server 51, a UE 11, and one or more web servers 31*a* and 31*b*. In an example of FIG. 1, it is assumed that a first web server 31*a* has "AA" as a long address and "a" as a short address, and a second web server 31*b* has "BB" as a long address and "b" as a short address. The long address as the web address may be understood as a normal Uniform Resource Locator (URL) address. Each of the first and second web servers 31*a* and 31b is a server operated by a communication operator or a UE manufacturer, and is for a use of a communication service of the UE 11.

In the example of FIG. 1, the first and second web servers 31a and 31b have the long addresses, register 101 and 107 the web addresses AA and BB thereof to the web address conversion server 51, and receive an allocation of a short address in which an address of the web address conversion server 51 is configured as a host address, from the web address conversion server 51 (103 or 109). At this time, the registration of the web address is not necessarily performed by the first and second web servers 31a and 31b, and may be requested by a network entity or a service provider which is not illustrated. The UE 11 receives a short address a or b of the first or second web server 31a or 31b by a separate communication channel (105 or 111), and connects to the web address conversion server 51 using the short address instead of the long address (113). The web address conversion server 51 replies the long address AA or BB of the first or second web server 31a or 31b to the UE 11 according to information on the first and second web servers 31a and 31b which are previously registered (115), to induce (redirect) the UE 11 to connect to the first or second web server 31a or 31b having the long address. The UE 11 may receive information for downloading a profile provided from a corresponding communication operator by connecting to the first or second web server 31a or 31b, using the long address obtained from the web address conversion server 51 (117 or 119).

In FIG. 1, a matching table of the registered long addresses of the first and second web servers 31a and 31b and the short addresses allocated to the long addresses is stored in the web address conversion server 51. With reference to the matching table, the web address conversion server 51 replies, to the UE 11, the long address of the web server 31a or 31b corresponding to the short address to which the UE 11 is connected. At this time, there is inconvenience that in a case in which web address conversion service are to be provided from at least two web servers 31a and 31b, the web servers 31a and 31b transfer two or more short addresses to the UE 11 using a separate channel, and in a case in which the addresses of the web servers 31a and 31b are updated, a new short address is transferred to the UE again by receiving an allocation of the new short address by the web address conversion server 51.

Figure 2:
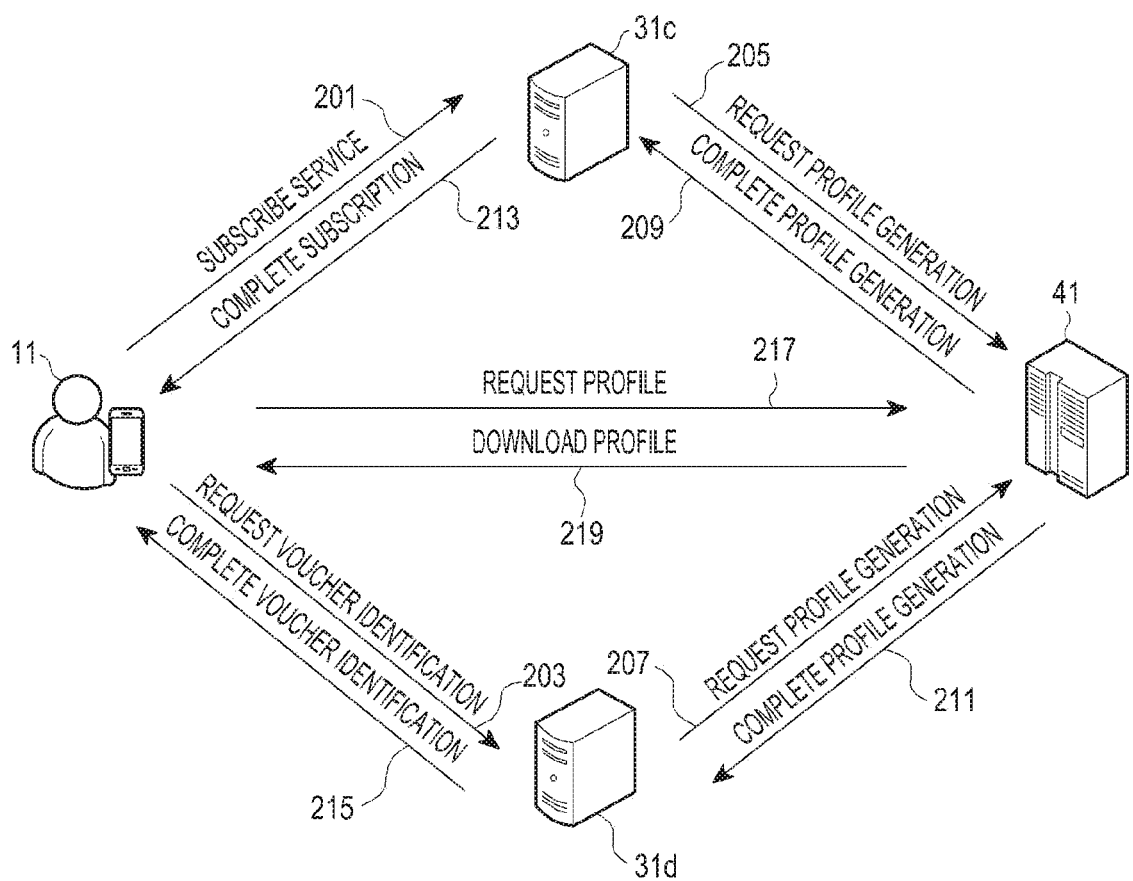
FIG. 2 is a diagram illustrating an embodiment in which a profile is remotely provided to a UE in the communication system.

FIG. 2 is a diagram illustrating an embodiment in which the profile is remotely provided to the UE in the communication system.

Referring to FIG. 2, a configuration of the communication system remotely providing the profile may include at least one of at least one profile server 41, the UE 11, and one or more profile download request processing servers 31c and 31d (e.g., a server processing a new subscription of a service, a server identifying a profile download voucher of a user, or the like). For convenience of description, it is assumed that the reference numeral 31c is the new subscription server, and the reference numeral 31d is the voucher identification server.

In FIG. 2, the UE 11 may start a profile installation by the profile download request processing server 31c and 31d, which are different from each other, according to a method of downloading the profile. The profile download request processing server 31c and 31d may be implemented as a web server type. For example, in a case of a new subscription to a communication operator, a subscription application and a profile download request may be proceed by the new subscription server 31c (201). As another example, in a case in which a profile download voucher issued or sold by a communication operator for the profile download, the profile download may be requested by the voucher identification server 31d (203). Addresses of the profile download request processing servers 31c and 31d may be provided to the UE 11 or a user by the web address conversion service described with reference to FIG. 1. The profile download request processing servers 31c and 31d request a generation of the profile to the profile server 41 according to a request of the user (205 or 207), and the profile server 41 notify a completion of the generation of the profile to the download request processing server 31c or 31d (209 or 211). Then, the download request processing server 31c or 31d transfers a notification (a new subscription completion or a voucher identification completion) according to the completion of the generation of the profile, to the UE 11 (213 or 215). The UE 11 performs a profile download function for remotely downloading the profile to connect to the profile server 41 designated by the profile download request processing servers 31c or 31d (217), and download the profile from the profile server 41 to install the profile (219).

At this time, in a case in which the address (URL) of the profile download request processing server 31c or 31d is long, there is an inconvenience that inputting the long address of the corresponding profile download request processing server 31c or 31d is inconvenient. In addition, in a case in which the UE 11 progresses with the profile download without identifying a validity of the corresponding profile download request processing server 31c or 31d, there is a problem that security may be threatened owing to a malicious script, program or the like.

Figure 3:
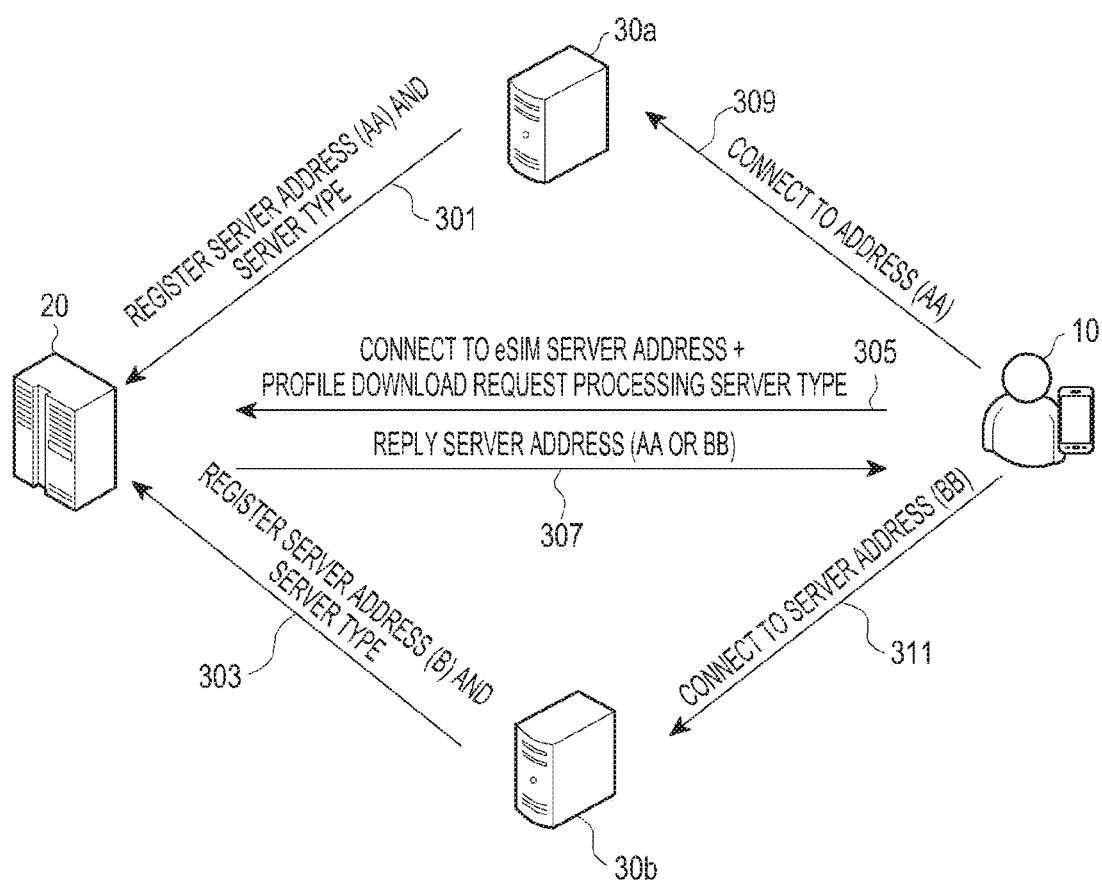
FIG. 3 is diagram illustrating a procedure in which the UE obtains an address of a profile download request processing server according to an embodiment of the present disclosure.

FIG. 3 is diagram illustrating a procedure in which the UE obtains the address of the profile download request processing server according to an embodiment of the present disclosure.

A communication system of FIG. 3 includes a UE 10, a plurality of web servers 30a and 30b performing a profile download request process, and an eSIM Application Programming Interface (API) server (hereinafter, referred to as eSIM server) 20 in which information on the plurality of web servers 30a and 30b is registered. For example, the information on the plurality of web servers 30a and 30b includes at least one of addresses of the web servers 30a and 30b, and a server type. The server type is information indicating whether the server performing the profile download request process is the new subscription server of the communication operator or the voucher identification server, and the web servers 30a and 30b may be the new subscription server or the voucher identification server. The voucher identification server is a server included in a system in a case in which the profile download voucher issued or sold by the communication operator for the profile download is used. In an embodiment of the present disclosure, the server type is an example, and the server type may correspond to various servers capable of performing the profile download request process, such as a device change identification server of the communication operator, a server providing various services, a server of a UE manufacturer, or the like. For example, in a case in which the eSIM server 20 receives the server type indicating the new subscription server from the UE 10, the eSIM server 20 provides a server address of the new subscription server among the servers performing the profile download request process, and in a case in which the eSIM server 20 receives the server type indicating the voucher identification server from the UE 10, the eSIM server 20 provides a server address of the voucher identification server among the servers performing the profile download request process. In embodiments of the present disclosure, as the server performing the profile download request process, the web server is described as an example, but the present disclosure is not limited thereto, and other types of servers capable of performing the profile download request process may be used. In a case in which a request message including the server type is received from the UE 10, the eSIM server 20 provides, to the UE 10, the address of a profile download request processing server (e.g., the web server 30*a* or 30*b*) corresponding to the server type, in response to the request message.

Referring to FIG. 3, the web servers 30*a* and 30*b* performing the profile download request process register the addresses (URL) and the server types thereof in the eSIM server 20 (301 or 303). The UE 10 inquires the address of the profile download request processing server corresponding to the server type by connecting to the eSIM server 20 (305). The eSIM server 20 replies the address of the web server 30*a* or 30*b* corresponding to the server type included in the inquiry (or request message) received from the UE 10 (307). Then, the UE 10 approaches the web server 30*a* or 30*b* having the address replied from the eSIM server 20 (309 or 311). In a case in which a plurality of profile download request processing servers is registered in the eSIM server 20, the plurality of profile download request processing servers may not be profile download request processing servers operated by the same operation main agent (e.g., a communication operator).

According to the procedures of FIG. 3, in comparison with the web address conversion service of FIG. 1, the UE may obtain the addresses of the plurality of web servers (profile download request processing servers) using a single address (i.e., an address of the eSIM server). In addition, there is an advantage that in a case in which the addresses of the web servers (profile download request processing servers) are updated, only the address registered in the eSIM server is corrected and the web server address update may not be notified to the UE. Further, in the procedures of FIG. 3, the address and the server type of the eSIM server 20 may be previously stored in the UE 10, or may be transferred to the UE 10 by a separate communication channel.

Figure 4:
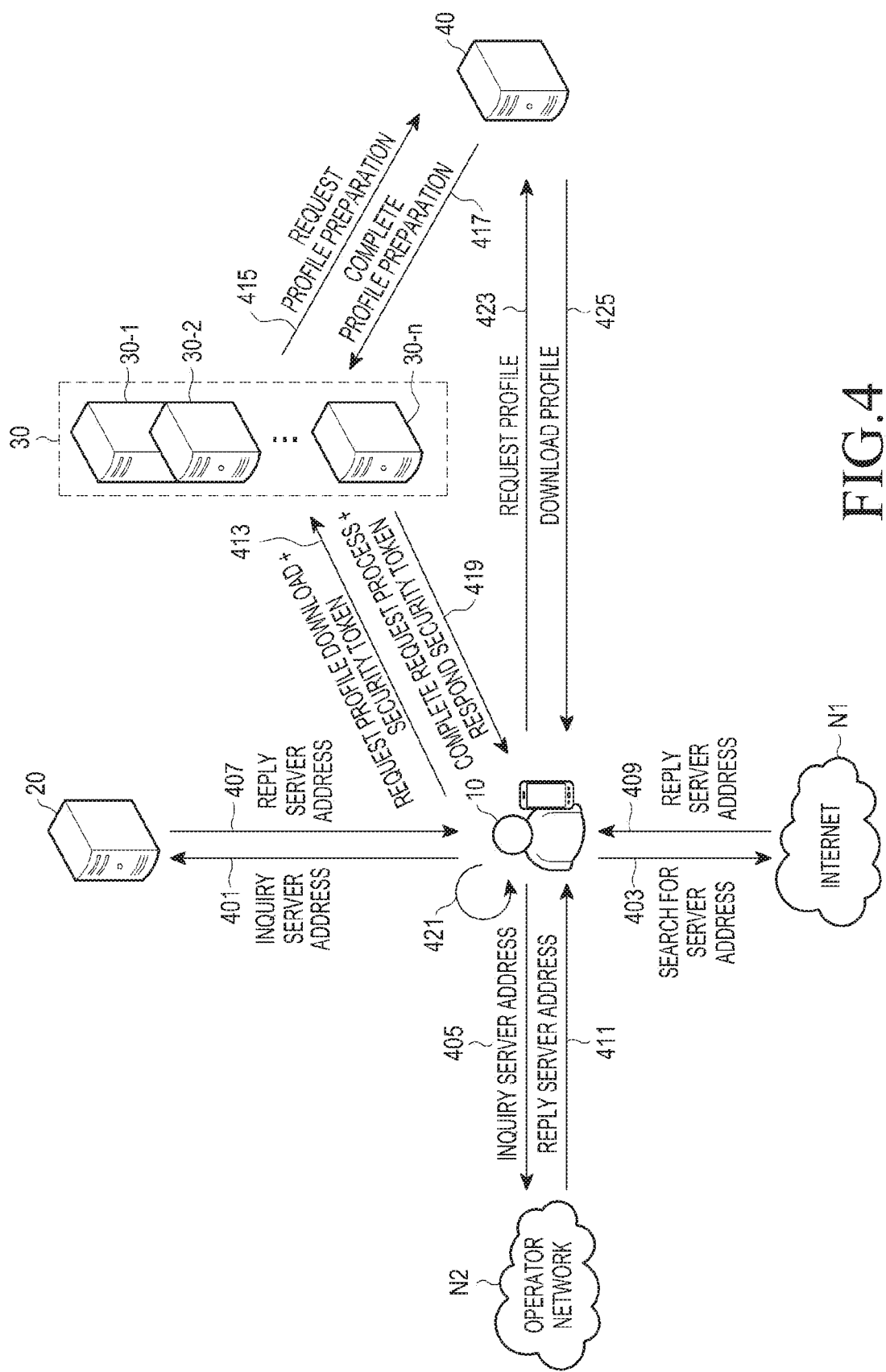
FIG. 4 is a diagram illustrating a procedure in which the UE remotely downloads the profile according to an embodiment of the present disclosure.

FIG. 4 is a diagram illustrating a procedure in which the UE remotely downloads the profile according to an embodiment of the present disclosure, and illustrates a procedure in which the UE remotely downloads the profile using the address obtained from the profile download request processing server.

Referring to FIG. 4, according to the procedure illustrated in FIG. 3, the UE may obtain one URL of the plurality of profile download request processing servers (e.g., web servers 30-1, 30-2, . . . , 30-*n*: 30) by the eSIM server 20 (401 and 407). The address of the eSIM server 20 is a web address of a short address. The address of the eSIM server 20 may be previously stored in the UE 10 or may be transferred to the UE by a separate communication channel. In addition, when the UE 10 attempts to connect to the eSIM server 20 initially, the eSIM server 20 and the UE 10 may transmit or mutually exchange security information such as a digital certificate and a digital signature, to perform an authentication process. In addition, in a case in which a connection to the eSIM server 20 is not smooth or the UE 10 is not able to use the eSIM server 20, instead of the operations 401 and 407, the UE 10 may perform Internet N1 search (403 and 409), or receive a text message or an email transmitted by a network N2 of a communication operator (405 and 411), and thus the UE 10 may obtain one URL of the profile download request processing servers. The profile download request processing servers 30 which may be guided by a corresponding eSIM server 20 may not be operated by the same operation main agent (e.g., communication operator). In a case in which the UE 10 transmits a security token together with a request message requesting the profile download to the profile download request processing server 30 specified as the URL (413), the profile download request processing server 30 transfers the request of the UE 10 to the profile server 40 to request a preparation of the profile (415). The UE 10 may generate the security token. In a case in which the profile server 40 prepares the profile and notifies a completion of the preparation to the profile download request processing server 30 (417), the profile download request processing server 30 replies, to the UE 10, identification information of the profile server 40 and at least one of identification information of the prepared profile and a response to the security token, together with a message notifying a completion of the profile download request process (419). The UE 10 identifies the response of the profile download request processing server 30 for the security token (421), to verify a validity of the profile download request processing server 30. Then, the UE 10 connects to the profile server 40 to request the profile (423), and downloads the profile to install the profile (425).

According to the procedures described with reference to FIG. 4, in comparison with the profile installation process described with reference to FIG. 2, instead a user directly inputs the long web address of the profile download request processing server to the UE, the web address of the profile download request processing server is obtained by the eSIM server having the short web address. Therefore, it is convenient for the user to input the web address to the UE. In addition, the validity of the profile download request processing server is verified using the security token, and thus security threat of a web interface is low.

Hereinafter, embodiments of the present disclosure for remotely downloading the profile in the communication system will be described more specifically. In addition, in the following embodiments, for convenience, the profile download request processing server is commonly referred to as a web server.

Figure 5:
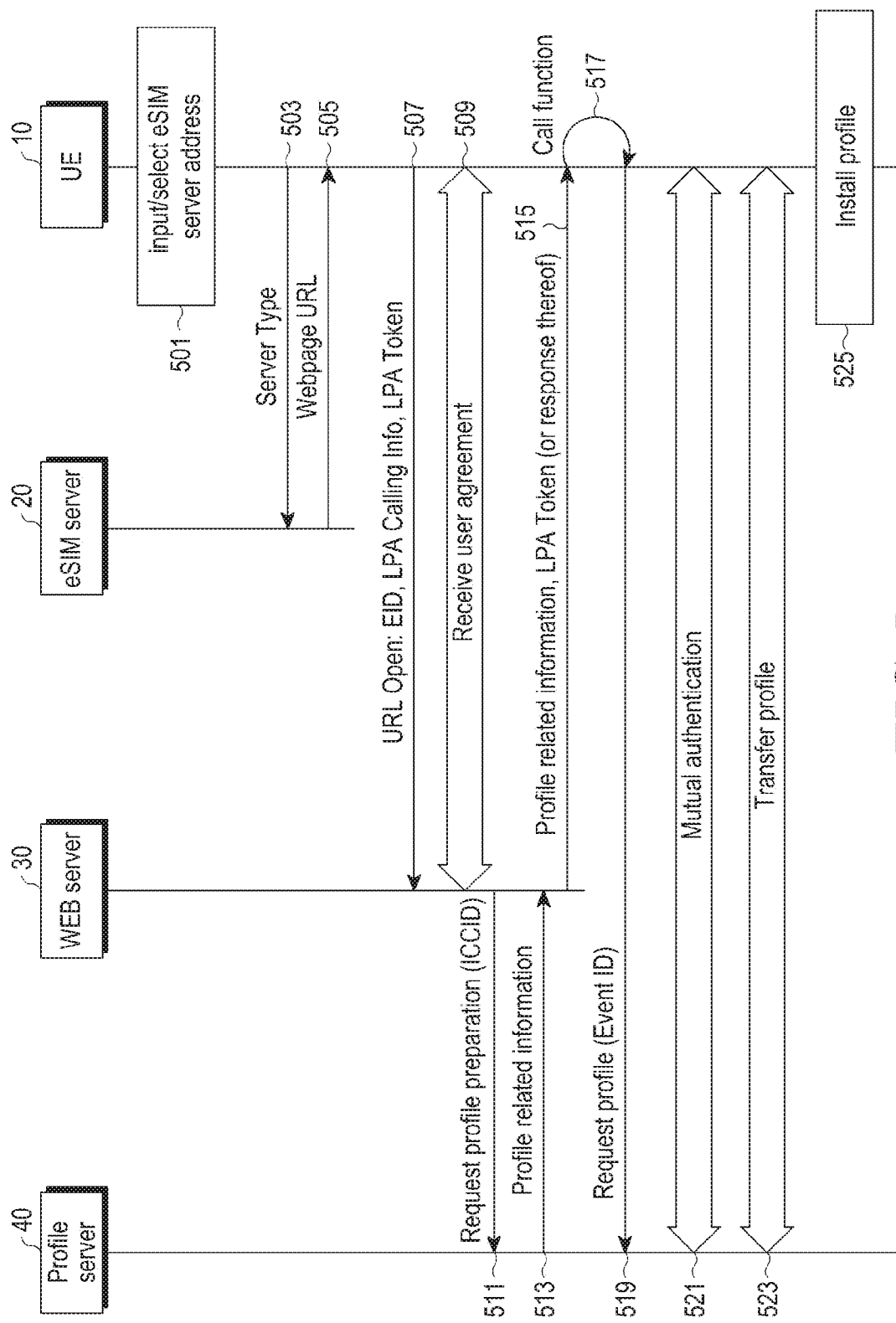
FIG. 5 is a flowchart illustrating a procedure in which the UE remotely downloads the profile according to an embodiment of the present disclosure.

FIG. 5 is a flowchart illustrating a procedure in which the UE remotely downloads the profile according to an embodiment of the present disclosure.

Referring to FIG. 5, in step 501, in a case in which the address of the eSIM server 20 is input/selected, in step 503, the UE 10 connects to the eSIM server 20 to transfer the server type of the web server 30, and in step 505, the UE 10 receives the address (webpage URL, or web server URL, hereinafter, referred to as 'URL') of the web server 30 which is suitable for the profile download request process from the eSIM server 20. The address of the eSIM server 20 input in step 501 may be given as an authorized domain name (i.e., Fully Qualified Domain Name, FQDN) of a short type. The user may select or input the domain address of the eSIM server 20 to the UE 10 using a random interface for inputting a number/character string to the UE, such as scanning a Quick Response (QR) code or barcode, directly inputting the number/character string, selecting one of address lists which are previously stored in the UE 10, or the like, which are publicly known. In addition, in step 501, if necessary, the UE 10 may automatically select the address of the eSIM server 20 from the previously stored address lists or the like without the input of the user. The eSIM server 20 may be a random server operated to provide an eSIM service by a communication operator or a UE manufacturer.

Then, in step 507, the UE 10 connects to the address (URL) of the web server 30 guided by the eSIM server 20 using a web browser or the like. The UE 10 generates a random number/character string (security token (LPA token, hereinafter, referred to as a token) and transmits the token to the web server 30. In step 507, a message transmitted from the UE 10 to the web server 30 includes at least one pieces of information (Local Profile Assistant (LPA) Calling Info) on an identifier (eUICC ID (EID)) of the UICC, a name (or class) of an eUICC control use application (e.g., a Local Profile Assistant (LPA)) installed in the UE 10 to download the profile, a name of a function included in a corresponding application. In step 509, in association with the profile download and installation, a procedure for inquiring agreement or disagreement of a user may progress between the web server 30 and the UE 10. The operation of step 509 may be omitted. Next, in step 511, the web server 30 transfers, to the profile server 40, the profile identifier (e.g., the Integrated Circuit Card ID (ICCID)) or information (e.g., an active code which will be described later with reference to FIG. 16) designating the profile to request the preparation of the profile. In step 513, the web server 30 receives the profile related information from the profile server 40. The profile related information includes at least one of identification information (SRID(SM-SR ID) or DPID(SM-DP ID), hereinafter, referred to as "DPID") of the profile server 40, and identification information (event ID) of the profile. For example, the identification information (i.e., DPID) of the profile server 40 may use address information of the profile server.

Then, in step 515, in a case in which the web server 30 transmits, to the UE 10, the message including at least one of the profile related information and the response to the token (LPA token), in step 517, the UE may determine, based on the response to the token included in step 515, whether the web server 30 is a valid web server. As described in step 507, the UE 10 may transmit, to the web server 30, relevant information (LPA Calling Info, e.g., a name of a profile download function and a name of a software of an application in the UE 10 in which the corresponding function is included) together with the token, so that the web server 30 calls a specific function (e.g., a function for starting the profile download, hereinafter, referred to as 'profile download function') of the UE 10. Then, in step 517, after the UE 10 identifies the response to the token replied by the web server 30, and the UE 10 may perform the profile download function. Next, in steps 519, 521, 523, and 525, the UE 10 downloads the profile from the profile server 40 to install the profile. That is, in step 519, the UE 10 transmits, to the profile server 40, the profile request including the identification information (event ID) of the profile. In step 521, the UE 10 and the profile server 40 perform a mutual authentication procedure. Then, in step 523, the profile server 40 transfers the profile to the UE 10, and in step 525, the UE 10 installs the downloaded profile.

According to the embodiment, the eUICC UE may easily connect to the profile download request processing server (web server) having the long web address (URL) by the eSIM server having the short web address (Uniform Resource Locator (URL)). In addition, the eUICC UE may verify the validity of the web server using the security token, and thus the eUICC UE may securely start the download of the profile.

FIGS. 6 to 9 illustrate methods in which the address of the web server 20 is inquired and responded between the UE 10 and the eSIM server 20.

In FIGS. 6 to 9, the address of the eSIM server 20 is exemplified as "www.mno.com", and the address of the web server 30 is exemplified as "subscription.mno.com".

Figure 6:
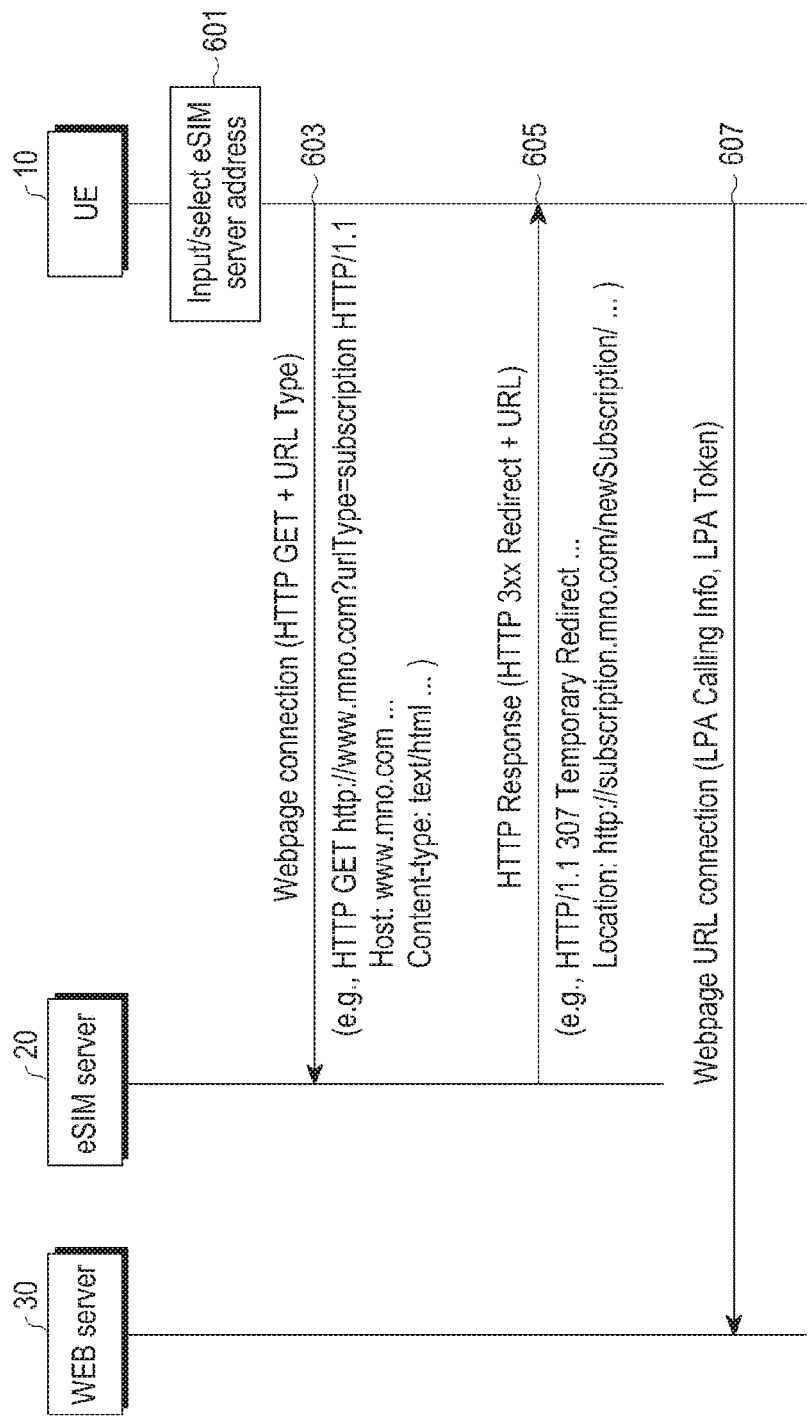
FIG. 6 is a flowchart illustrating a procedure in which an eSIM server transfers an address of a web server to the UE using an HTTP Redirection message according to an embodiment of the present disclosure.

FIG. 6 is a flowchart illustrating a procedure in which the eSIM server transfers the address of the web server to the UE using the HTTP Redirection message according to an embodiment of the present disclosure.

Referring to FIG. 6, in step 601, the UE 10 may receive the address of the eSIM server 20 by the QR code scan, the user input, or the automatic selection. In step 603, the UE 10 may transmit, to the eSIM server 20, the server type of the web server 30 together with an HTTP GET request message, by including the server type of the web server 30 in the HTTP GET request message as the URL factor (URL parameter). The URL factor (URL parameter) may be included an URL open message in a case of a URL connection. For example, the server type may be expressed as the URL factor. The URL connection refers to a connection to the eSIM server 20 from the UE 10.

In step 605, the eSIM server 20 may induce (redirect) the UE 10 attempts to connect to the suitable web server 30 using, for example, HTTP 3xx Redirect message (e.g., 307 Temporary Redirect). In step 607, while the UE 10 attempts to connect to the web server 30 using the HTTP 3xx Redirect message, the UE 10 may display a User Interface (UI) notifying that Redirecting is being performed, to the user.

Figure 7:
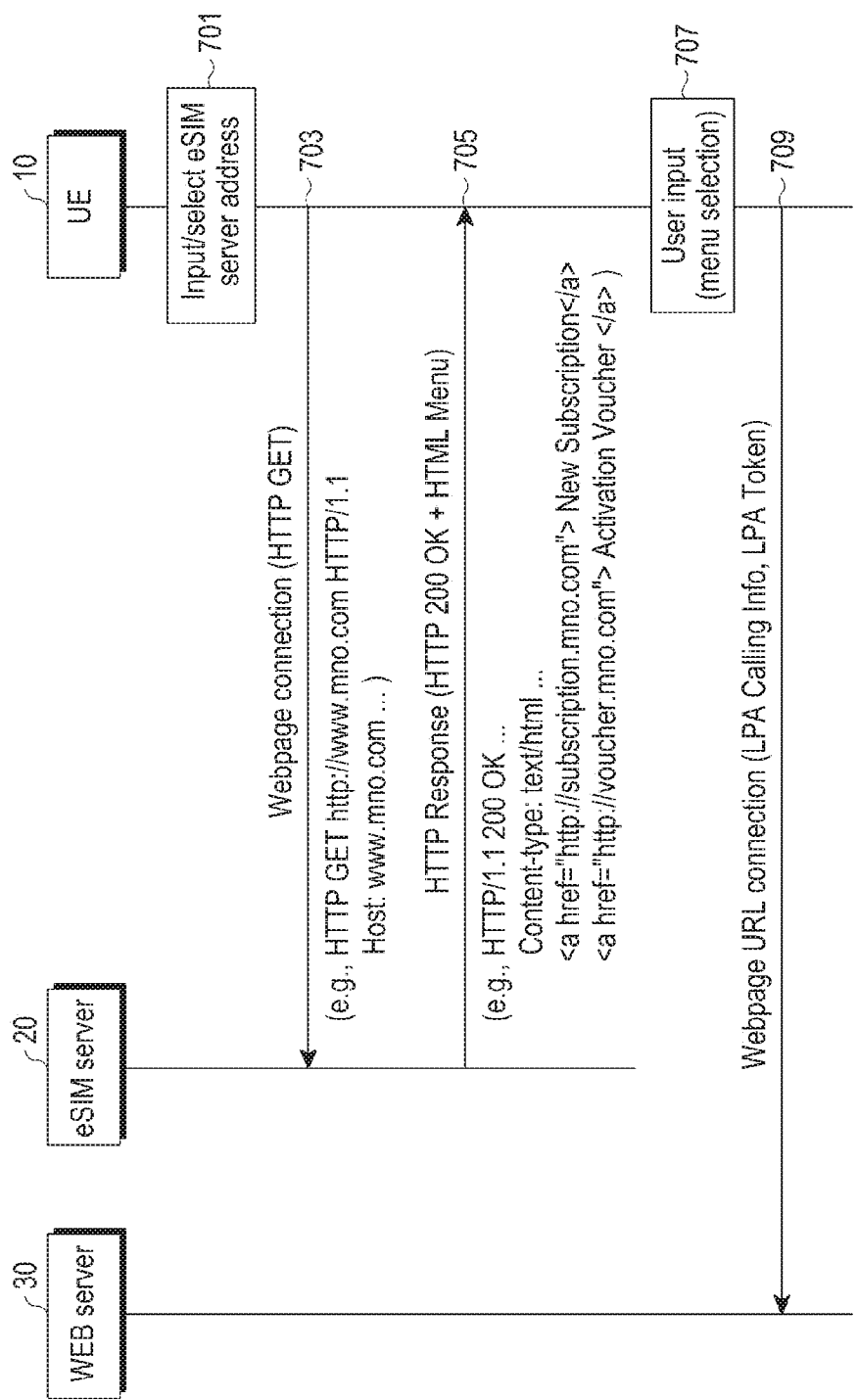
FIG. 7 is a flowchart illustrating a procedure in which the eSIM server transfers the address of the web server to the UE using an HTML link according to an embodiment of the present disclosure.

FIG. 7 is a flowchart illustrating a procedure in which the eSIM server transfers the address of the web server to the UE using an HTML, link according to an embodiment of the present disclosure.

Referring to FIG. 7, in step 701, the UE 10 may receive the address of the eSIM server 20 by the QR code scan, the user input, or the automatic selection. In step 703, the UE 10 may not transfer any additional information when the UE 10 transmits the HTTP GET request message to the eSIM server 20. In step 705, the eSIM server 20 may transfer, to the UE 10, a list of the web server 30 which may be served as an intermediation, using, for example, HTTP 200 OK message. Thus, in step 707, the user may directly select the suitable web server 30 using the UE 10. The HTML links written in the list of the corresponding web server 30 may include web addresses (URLs) of the web servers 30 so that the UE 10 may be connected to each suitable web server. For example, the HTML links may be displayed on the UE 10 by a UI of a type displaying the new subscription, the voucher activation, or the like so as to correspond to the server type. In step 709, the UE 10 may attempt to connect to the web server 30 selected by the user in step 707.

Figure 8:
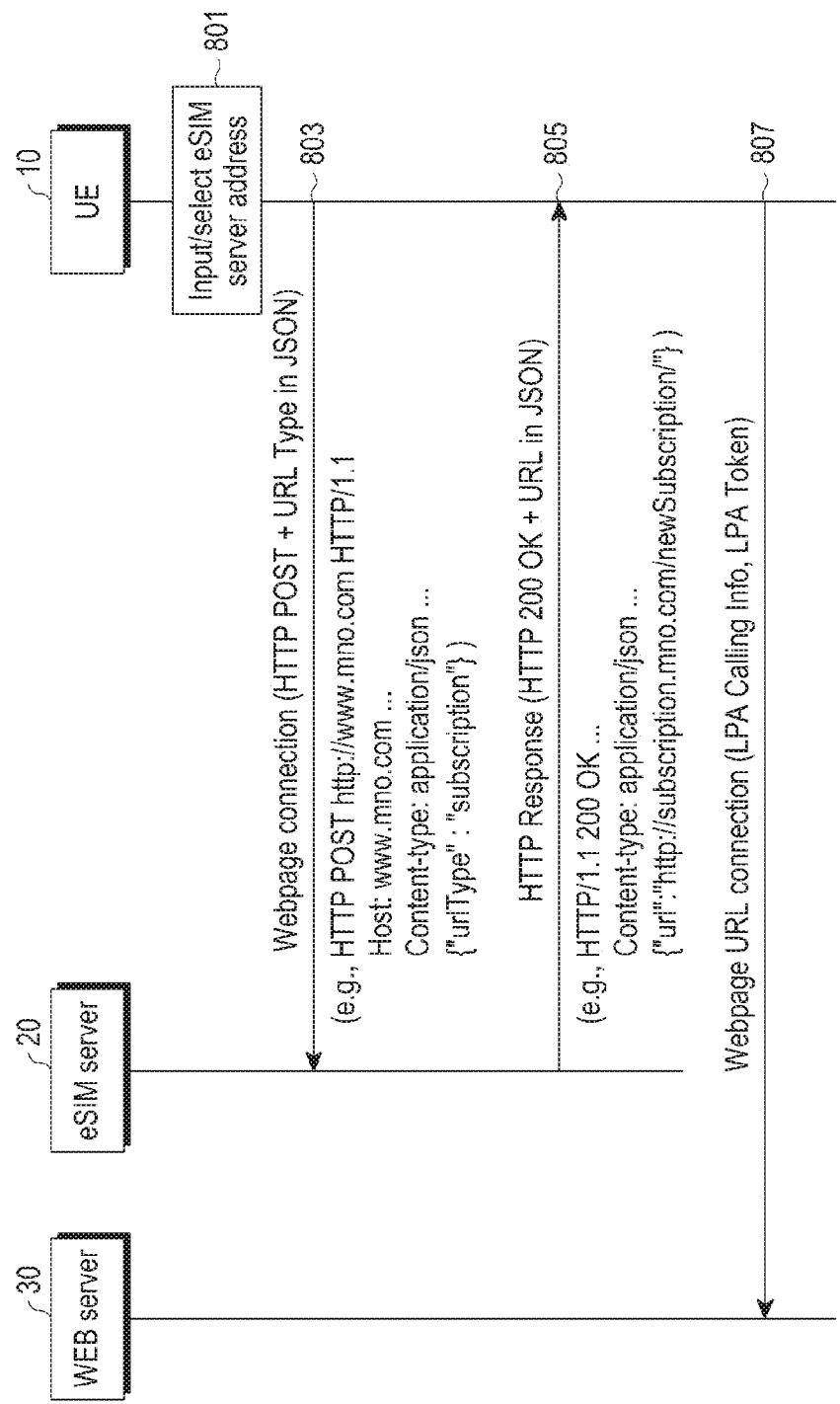
FIG. 8 is a flowchart illustrating a procedure in which the eSIM server transfers the address of the web server to the UE using a JSON message according to an embodiment of the present disclosure.

FIG. 8 is a flowchart illustrating a procedure in which the eSIM server transfers the address of the web server to the UE using the JSON message according to an embodiment of the present disclosure.

Referring to FIG. 8, in step 801, the UE 10 may receive the address of the eSIM server 20 by the QR code scan, the user input, or the automatic selection. In step 803, the UE 10 may transfer, to the eSIM server 20, the server type of the web server 30 together with an HTTP POST request message, by including the server type of the web server 30 in the HTTP POST request message as the JavaScript Object Notation (JSON) message type. The JSON is a data format using a text in order to transfer a data object. In step 805, the eSIM server 20 may write and transfer the address of the web server 30 to which the UE 10 is to be connected as the JSON message type using the HTTP 200 OK message. While the UE 10 attempts to connect to the web server 30 of which the address is obtained by the JSON message in step 807, the UE 10 may display a UI notifying that Redirecting is being performed, to the user.

The embodiments of FIGS. 6 to 8 may be performed as combined embodiments.

Figure 9:
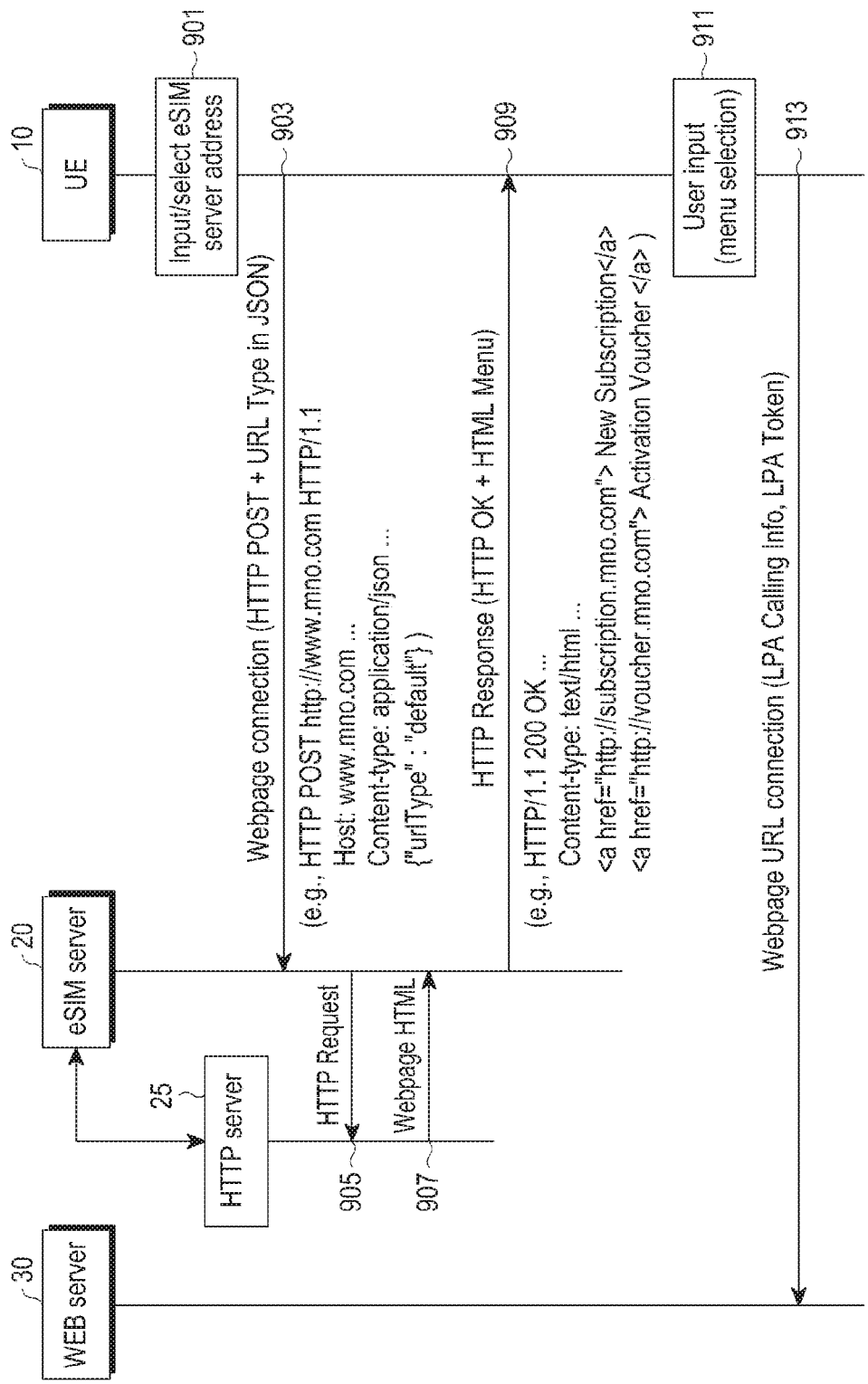
FIG. 9 is a flowchart illustrating a procedure in which the eSIM server transfers the address of the web server to the UE using the JSON message together with the HTML link according to an embodiment of the present disclosure.

FIG. 9 is a flowchart illustrating a procedure in which the eSIM server transfers the address of the web server to the UE using the JSON message together with the HTML link according to an embodiment of the present disclosure.

Referring to FIG. 9, in step 901, the UE 10 may receive the address of the eSIM server 20 by the QR code scan, the user input, or the automatic selection. In step 903, the UE may transfer, to the eSIM server 20, the JSON message together with the HTTP POST request message so that a corresponding eSIM server 20 replies the list of the web server 30 which may be served as an intermediation. In steps 905 to 909, the eSIM server 20 may transfer the list of the web server 30 which may be served as the intermediation using the HTTP 200 OK message so that the user may select the suitable web server 30. To this end, in steps 905 and 907, an HTTP server 25 responding a webpage (HTML) for an HTTP request may be provided. The HTML links written in the web server list indicated by a corresponding webpage may include the web addresses (URLs) of the web servers so that the UE 10 may be connected to each suitable web server 30. In step 911, in a case in which the web server 30 is selected by the user input/selection, in step 913, the UE 10 connects to the web server 30. For example, the HTML links may be displayed on the UE 10 by a UI of a type displaying the new subscription, the voucher activation, or the like so as to correspond to the server type.

Figure 10:
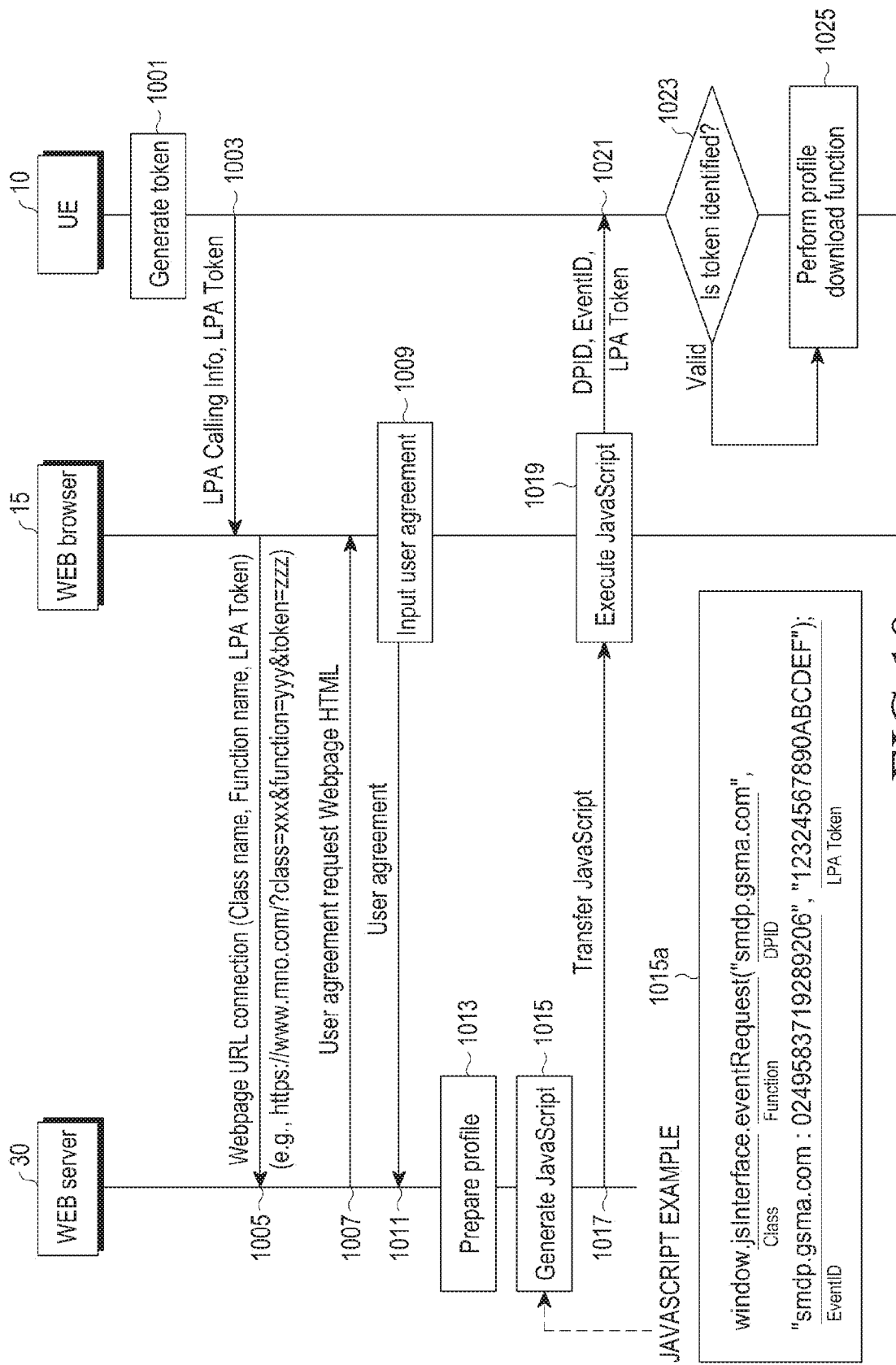
FIG. 10 is a flowchart illustrating a connection procedure using a JavaScript between the UE and the web server according to an embodiment of the present disclosure.
Figure 11:
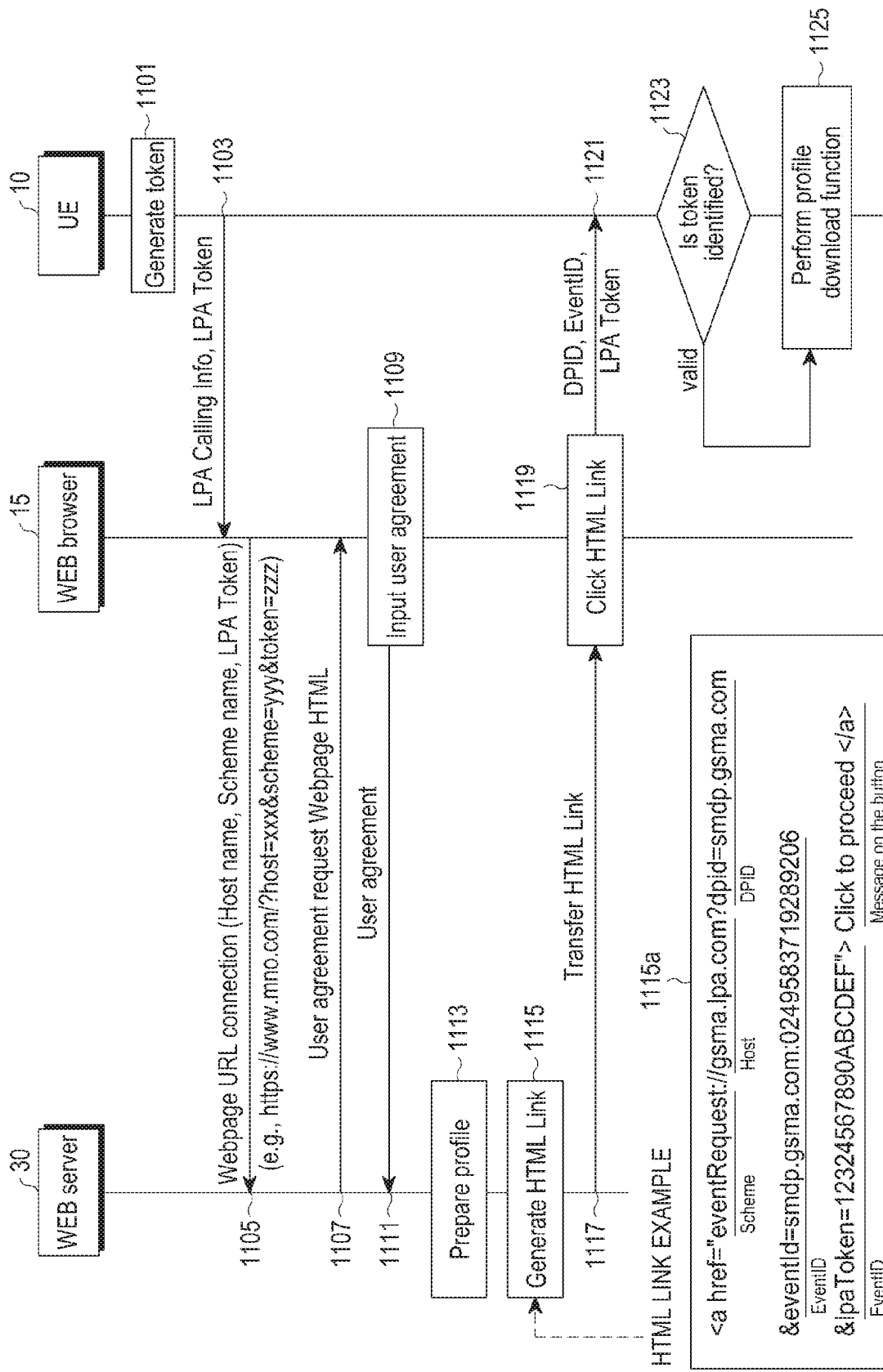
FIG. 11 is a flowchart illustrating a connection procedure using the HTML link between the UE and the web server according to an embodiment of the present disclosure.
Figure 12:
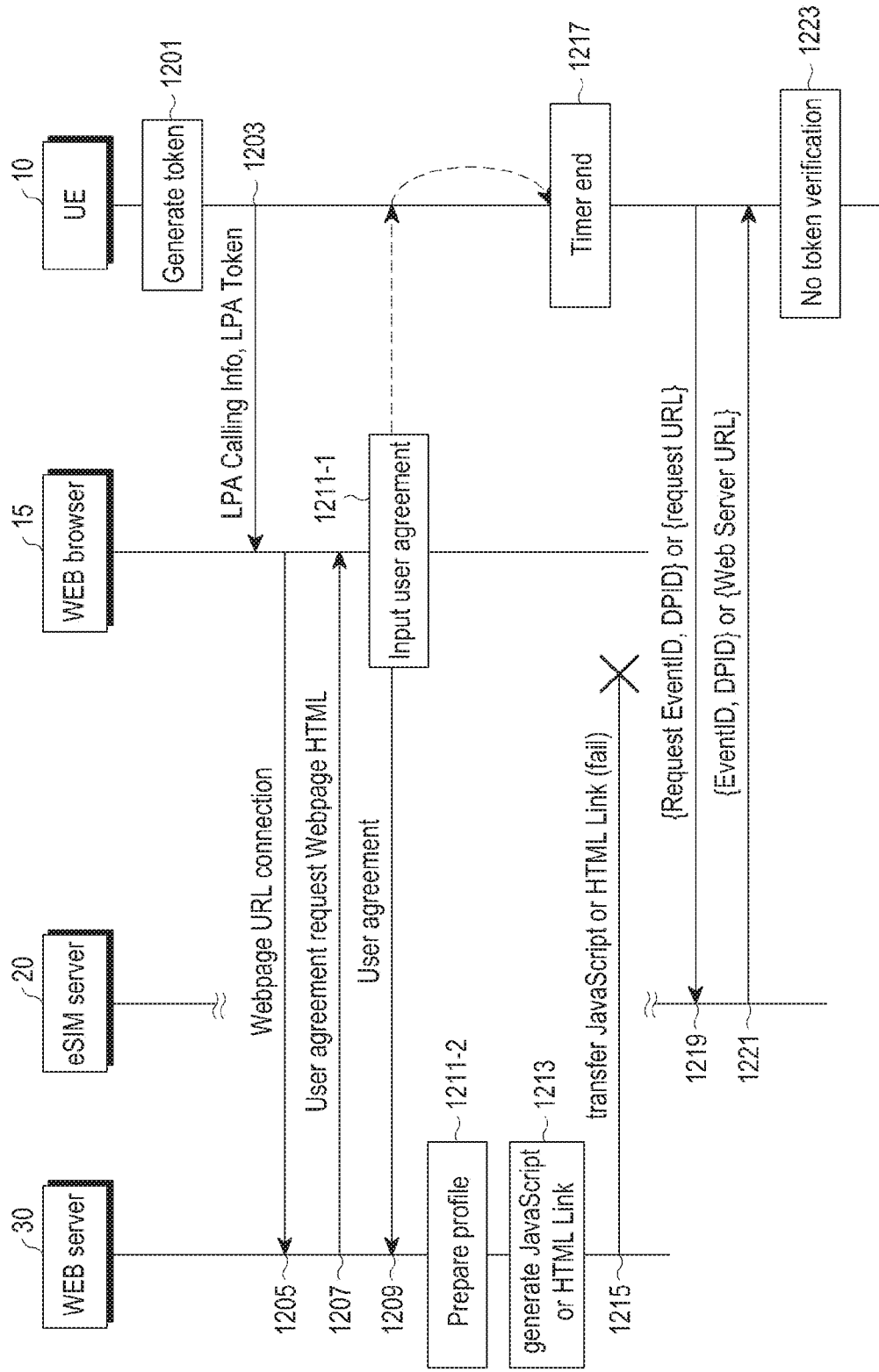
FIG. 12 is a flowchart illustrating an exception process in the connection procedure between the UE and the web server according to an embodiment of the present disclosure.

Hereinafter, with reference to FIGS. 10 to 12, embodiments for connecting the UE 10 and the web server 30 with each other are described. In the embodiments of FIGS. 10 to 12, a reference numeral 15 denotes a web browser of the UE 10. The web browser 15 may be implemented as a function included in the LPA (that is, a software of an application installed in the UE 10 so as to control the eUICC or the UICC according to an embodiment of the present disclosure) of the UE 10, and may perform operations illustrated in FIGS. 10 to 12. As another example, the LPA of the UE 10 may perform the operations illustrated in FIGS. 10 to 12 using a separate web browser which is previously installed in the UE 10. In this case, in FIGS. 10 to 12, the UE 10 corresponds to the LPA, a network entity including the LPA and the web browser 15 may be understood as the UE, and the operation of the UE 10 illustrated in FIGS. 10 to 12 may be understood as the operation of the LPA.

FIG. 10 is a flowchart illustrating a connection procedure using a JavaScript between the UE and the web server according to an embodiment of the present disclosure. An example of FIG. 10 suggests a method in which the web server 30 uses the JavaScript to call the profile download function of the UE 10.

Referring to FIG. 10, in step 1001, the UE 10 generates the security token. In steps 1003 and 1005, the UE 10 transfers, to the web server 30, information (e.g., a class name) on an application (e.g., an LPA application for controlling the eSIM) installed in the UE, and information (e.g., a function name) on the profile download function (e.g., ES9_EventRequest function in the LPA). The LPA Calling Info (i.e., application related information for the profile download) may be understood as information including the class name and the function name. In addition, the security token generated in step 1001 is for verifying the validity of the web server 30, and in a case in which a verification operation is performed, in steps 1003 and 1005, the security token is transferred to the web server 30 together with the LPA Calling Info. In steps 1007 to 1011, the web server 30 may receive, from the UE 10, the agreement for the profile download request of the user. At this time, the web server 30 may display a UI for identifying the agreement or disagreement of the user for the profile download and installation using the web browser 15 of the UE. In a case in which the agreement of the user for the profile download and installation is not necessary, in steps 1007 to 1011 may be omitted. In a case in which the agreement of the user is present or the agreement of the user is not necessary, in steps 1013 to 1017, after the preparation of the profile by the profile server is completed, the web server 30 may write JavaScript 1015a and replies the JavaScript 1015a to the UE 10 so as to call, based on the LPA Calling Info, the application and the profile download function of the UE 10. The replied JavaScript may include a program syntax capable of calling the application and the profile download function. In step 1019, in a case in which the JavaScript is called, in steps 1021 to 1025, the LPA application and the profile download function of the UE 10 are called, and thus the UE 10 performs the profile download function. At this time, the validity of the web server 30 may be verified using the token as shown in step 1023.

FIG. 11 is a flowchart illustrating a connection procedure using the HTML link between the UE and the web server according to an embodiment of the present disclosure. An example of FIG. 11 suggests a method in which the web server 30 uses the HTML link to call the profile download function of the UE 10.

Referring to FIG. 11, in step 1101, the UE 10 generates the security token. In steps 1103 and 1105, the UE 10 transfers, to the web server 30, information (e.g., a host name) on an application (e.g., the LPA for controlling the eUICC) installed in the UE, and information (e.g., a scheme name) on the profile download function (e.g., ES9_EventRequest function in the LPA). The LPA Calling Info may be understood as information including the host name and the scheme name. In addition, the security token generated in step 1101 is for verifying the validity of the web server 30, and in a case in which a verification operation is performed, in steps 1103 and 1105, the security token is transferred to the web server 30 together with the LPA Calling Info. In steps 1107 to 1111, the web server 30 may receive, from the UE 10, the agreement for the profile download request of the user. At this time, the web server 30 may display a UI for identifying the agreement or disagreement of the user for the profile download and installation using the web browser 15 of the UE. In a case in which the agreement of the user for the profile download and installation is not necessary, in steps 1107 to 1111 may be omitted. In a case in which the agreement of the user is present or the agreement of the user is not necessary, in steps 1113 to 1117, after the preparation of the profile by the profile server is completed, the web server 30 may write and reply HTML link 1115a so as to call, based on the LPA Calling Info, the application and the profile download function of the UE 10. A program syntax capable of calling the application and the profile download function may be included in the HTML link replied from the web server 30. In step 1119, in a case in which the HTML link is clicked, in steps 1121 to 1125, the LPA application and the profile download function of the UE 10 are called, and thus the UE 10 performs the profile download function. At this time, the validity of the web server 30 may be verified using the token as shown in step 1123.

FIG. 12 is a flowchart illustrating an exception process in the connection procedure between the UE and the web server according to an embodiment of the present disclosure.

An example of FIG. 12 suggests an exception operation process when the web server 30 calls the profile download function of the UE 10.

Referring to FIG. 12, in a case in which the transferal of the JavaScript or the HTML link used in embodiments of FIGS. 10 and 11 fails unexpectedly and thus the calling of the profile download function fails in a time limit measured by a timer, as a countermeasure, the UE 10 may request an exception process to the eSIM server 20. Operations of the steps 1201 to 1213 of FIG. 12 are similar to the corresponding operations of FIGS. 10 and 11, and thus specific descriptions thereof are omitted.

Referring to FIG. 12, in steps 1215 and 1217, although it is illustrated that the calling failure of the profile download function is determined as a case in which the JavaScript or the HTML link is not received in a time limit, a method of determining the calling failure of the profile download function is not limited to the failure detection of the JavaScript or the HTML, link reception using the timer. For example, a case in which a normally received JavaScript or HTML link includes a syntax error or the like and is not able to be performed, or the like, may be regarded as the reception failure of the JavaScript or HTML link. In addition, a case in which the profile download is stopped owing to an operation error of the UE during the performance of the profile download, or the like, may be regarded as the calling failure of the profile download function.

In step 1219, the UE 10 may inquire the profile server and the profile information in order to request the exception process to the eSIM server 20. In response to the inquiry, in step 1221, the eSIM server 20 may transfer, to the UE 10, the address of the profile server and information (e.g., identification information of the profile, or the like) necessary to download the profile. In addition, as shown in step 1223, the above described verification operation (e.g., the operation of step 1023 in FIG. 10 or the operation of step 1123 in FIG. 11) of the web server 30 using the token may be omitted.

In addition, in step 1219, the UE 10 may inquire the address of the web server 30 again in order to request the exception process to the eSIM server 20. To this end, in a case in which the preparation of the profile is previously completed, the eSIM server 20 may transfer, to the UE 10, the address of the profile server and information (e.g., identification information of the profile, or the like) necessary to download the profile, to enable the UE 10 to omit the connection to the web server 30 and directly request the profile download to the profile server. In addition, in a case in which the preparation of the profile is not completed yet, the eSIM server 20 may transmit the address of the web server 30 so that the UE 10 newly attempt to request the profile download. An entity determining whether the inquiry for the address of the web server 30 which is received by the eSIM server 20 is a multiplying inquiry may be the eSIM server 20 or the UE 10. In a case in which the entity determining the multiplying inquiry or not is the UE 10, when the UE 10 inquires the address of the download request processing server, the UE 10 may specify the address of the download request processing server to inquire the address of the download request processing server.

It should be noted that in the embodiments of FIGS. 10 to 12, the use of the JavaScript and the use of the HTML link among the methods of calling the profile download function of the UE 10 are not exclusive of each other. That is, the UE 10 may transfer, to the web server 30, both of the information (e.g., the class name and the function name) necessary to generate the JavaScript and the information (e.g., the host name and the scheme name) necessary to generate the HTML link. The web server 30 may suitably combine the received information and may select at least one method to be used in the profile download function calling, of the JavaScript (the example of FIG. 10) and the HTML link (the example of FIG. 11). In a case in which the web server 30 calls the profile download function of the UE 10 using a plurality of methods, the UE 10 may call the profile download function once by selecting one of the plurality of calling methods. In addition, in a case in which the selected one method among the plurality of profile download function calling methods fails in the calling of the profile download function (refer to FIG. 12), the UE 10 may select another method among remaining calling methods and may perform the selected other method prior to the exception process method of the embodiment of FIG. 12.

Figure 13:
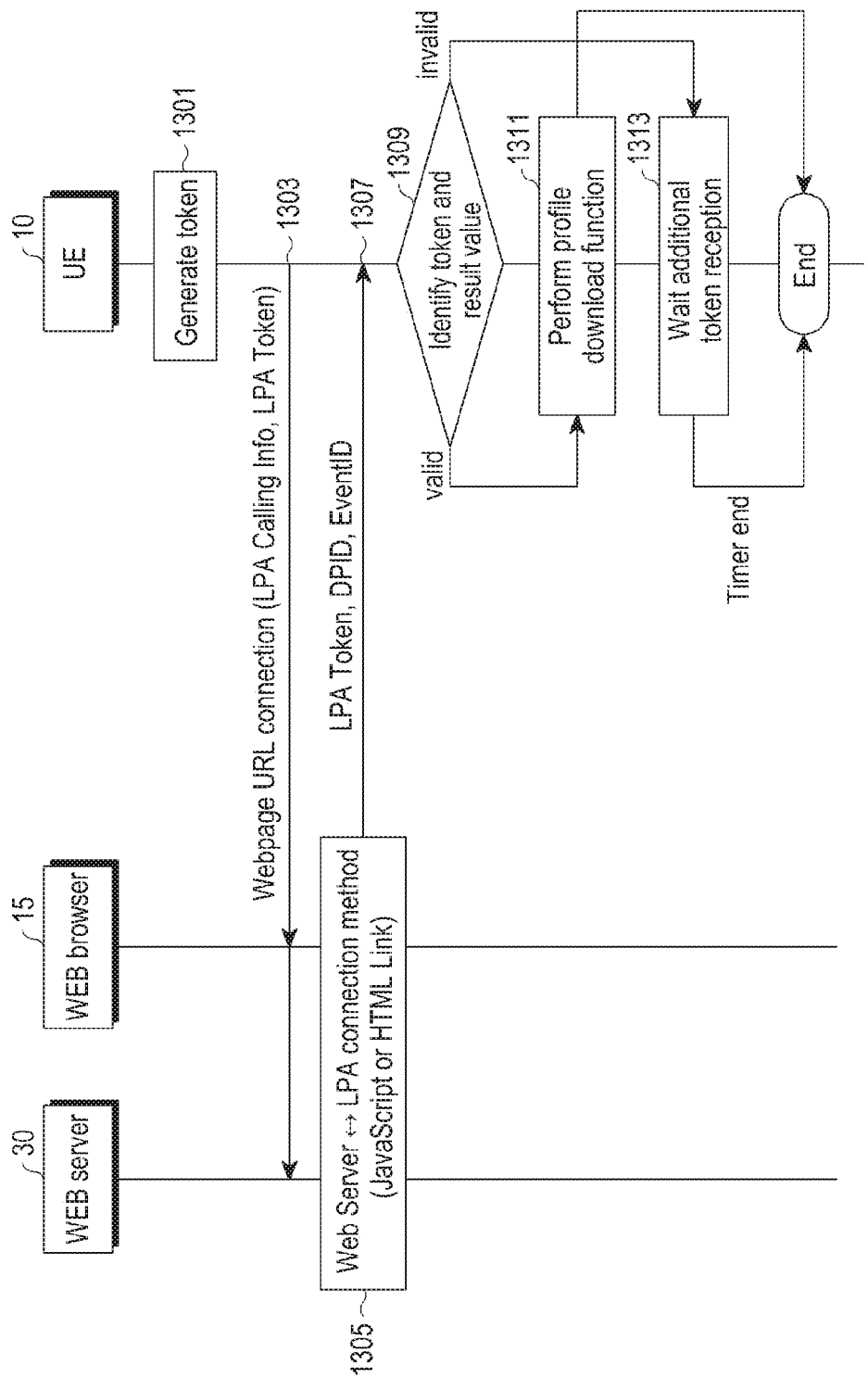
FIGS. 13 to 15 are flowcharts illustrating an authentication process of the web server for a profile download process according to an embodiment of the present disclosure.

FIG. 13 is a flowchart illustrating an authentication process of the web server for the profile download process according to an embodiment of the present disclosure, and illustrates an example of the web server verification procedure using the security token.

Referring to FIG. 13, in step 1301, whenever the UE 10 attempts to connect to the web server 30, the UE 10 may newly generate the number/character string (hereinafter, "token") randomly, and in step 1303, the UE 10 may transfer the token to the web server 30. The token transferal in step 1303 may be performed using the web browser 15. The generated token may be updated as another value whenever the token is generated. In steps 1305 and 1307, according to the embodiments described with reference to FIGS. 10 to 12, when the web server 30 calls the profile download function of the UE 10, the web server 30 may transmit, to the UE 10, the token, by including the token in the profile download function calling program (the JavaScript or HTML link). Then, in steps 1309 and 1311, in a case in which the token included in the profile download function calling program replied from the web server 30 in step 1309 is equal (valid) to the token generated by the UE 10 in step 1301, the UE 10 may regard that the corresponding profile download function calling is the calling from the valid web server, and may perform the profile download function.

In step 1309, in a case in which the verification of the token fails (invalid), in step 1313, the UE 10 may wait for a certain period of time in order to receive the token additionally. This is for preventing leakage of a valid token of which transmission is delayed owing to an invalid token transferred prior to the valid token by a malicious web server or the like. In a case in which the UE 10 does not perform the waiting for the additional reception or the waiting time is ended, the UE 10 may recognizes that the reception of the token fails and may end the operations.

Figure 14:
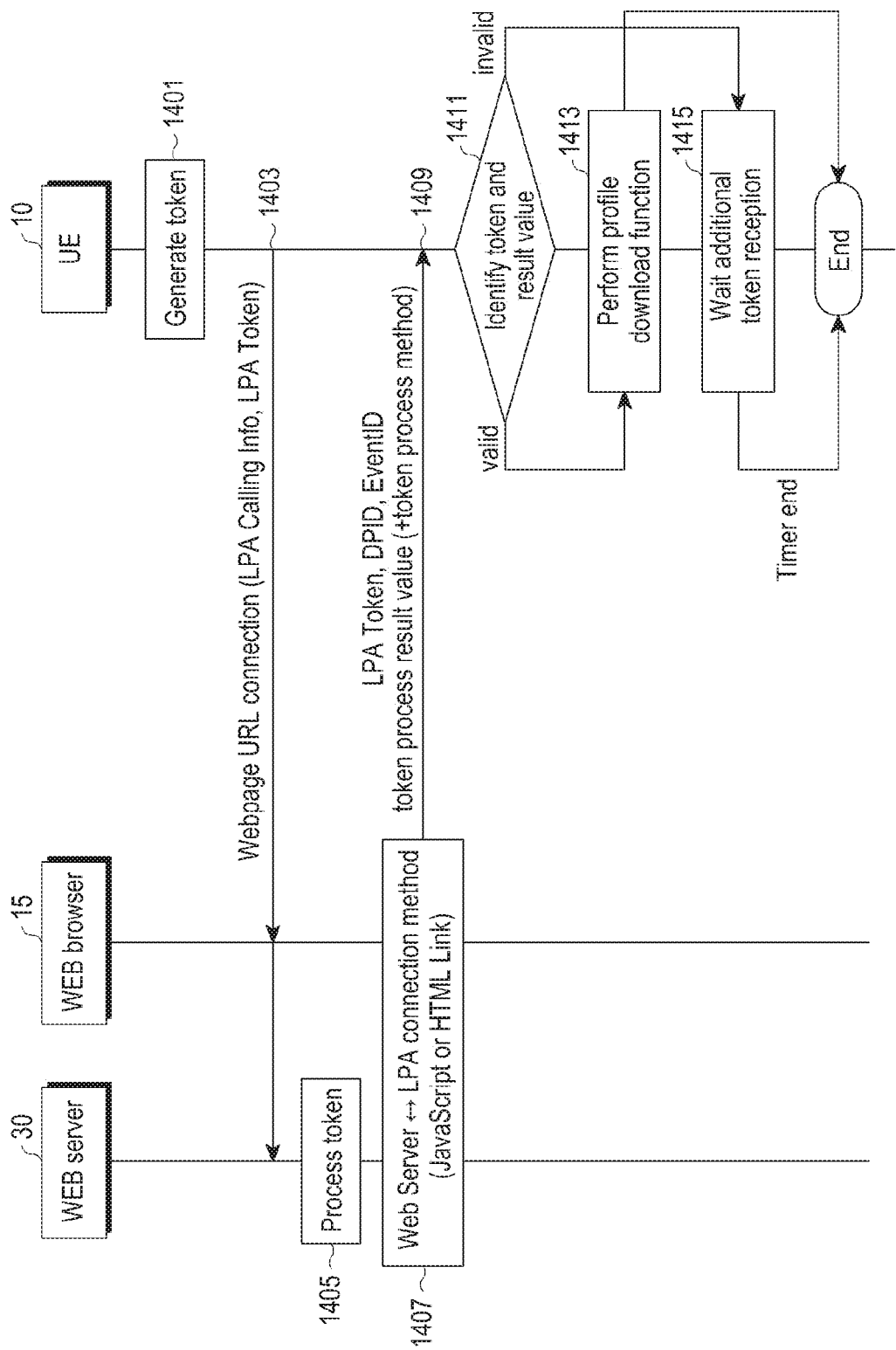

FIG. 14 is a flowchart illustrating the authentication process of the web server for the profile download process according to an embodiment of the present disclosure, and illustrates another example of the verification procedure using the token.

Referring to FIG. 14, in step 1401, whenever the UE 10 attempts to connect to the web server 30, the UE 10 may newly generate the token, and in step 1403, the UE 10 may transfer the token to the web server 30. The token transferal in step 1403 may be performed using the web browser 15. The generated token may be updated as another value whenever the token is generated. In steps 1405 to 1409, according to the embodiments described with reference to FIGS. 10 to 12, when the web server 30 calls the profile download function of the UE 10, the web server 30 may transmit, to the UE 10, the token and a result value obtained by processing the token according to a predetermined algorithm, by including the token and the result value in the profile download function calling program (the JavaScript or HTML link). Then, in steps 1411 and 1413, in a case in which the token and the token process result value included in the profile download function calling program replied from the web server 30 in step 1409 are equal (valid) to the token generated by the UE 10 in step 1401 and an expected token process result value, the UE 10 may regard that the corresponding profile download function calling is the calling from the valid web server, and may perform the profile download function. In addition, in a case in which the verification of the token fails (invalid), as described with reference to FIG. 13, in step 1415, the UE 10 may wait for a certain period of time in order to receive the token additionally.

In the embodiment of FIG. 14, the reply of the web server 30 in step 1409 may selectively include at least one of the token and the token process result value. In addition, the algorithm processing the token in step 1405 may be, for example, a digital signature using a digital certificate or a hashing process of the token, as illustrated in an embodiment of FIG. 15 which will be described later. In addition, information on a predetermined algorithm or a corresponding algorithm processing the token may be included in the reply of the web server 30, may be exchanged in a message exchange process between the UE 10 and the web server 30 of the previous step, may be shared by a separate communication channel, or may be previously stored in the UE 10, as illustrated in the embodiment of FIG. 15 which will be described later.

Figure 15:
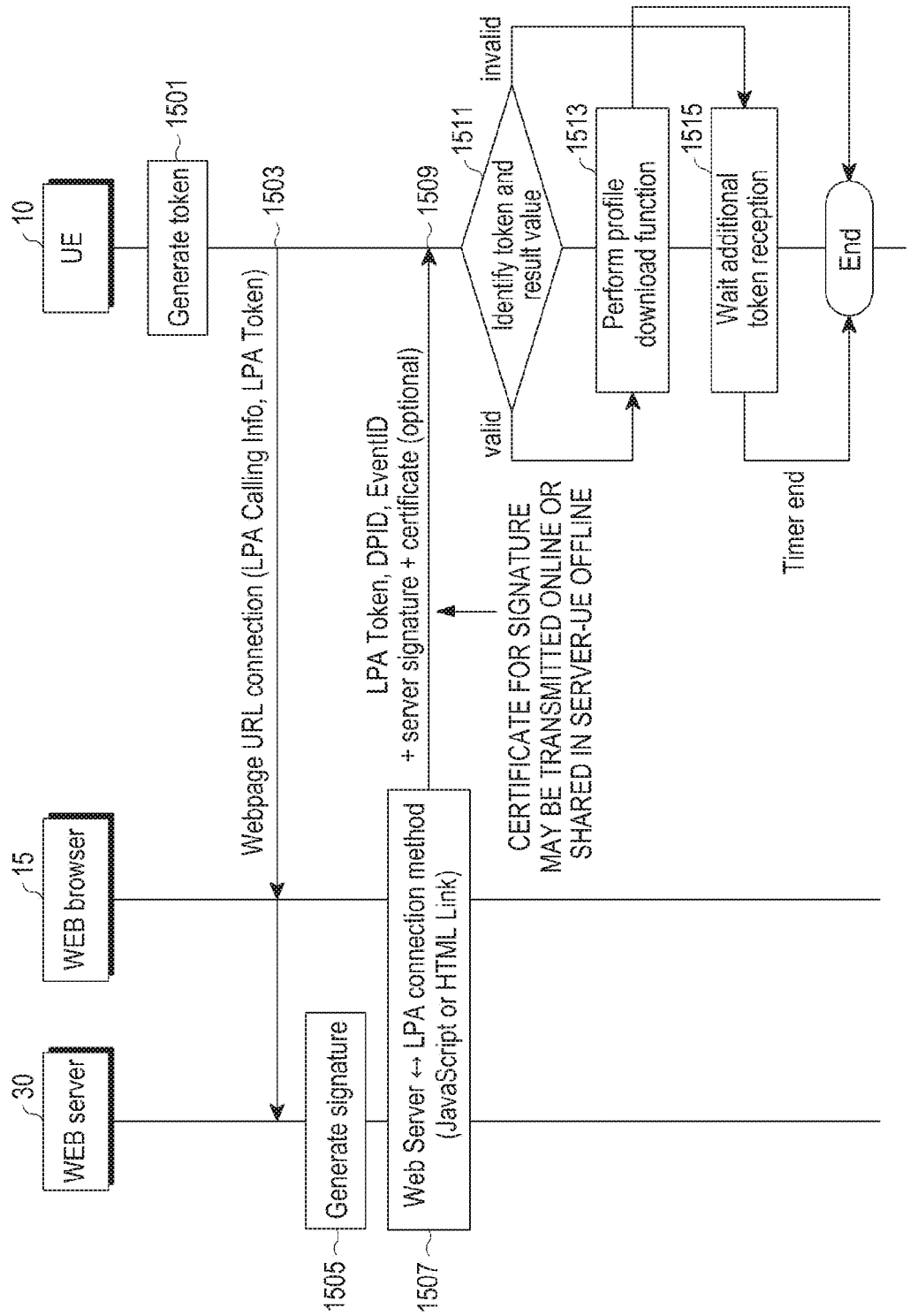

FIG. 15 is a flowchart illustrating the authentication process of the web server for the profile download process according to an embodiment of the present disclosure, and illustrates further another example of the verification procedure using the token.

Referring to FIG. 15, in steps 150 and 1503, the UE 10 may generate the token and transfer the token to the web server 30. The token transferal in step 1503 may be performed using the web browser 15. The generated token may be updated as another value whenever the token is generated. In steps 1505 to 1509, according to the embodiments described with reference to FIGS. 10 to 12, when the web server 30 calls the profile download function of the UE, the web server 30 may transmit, to the UE 10, the token and the digital signature signed in the token using the digital certificate, by including the digital signature in the profile download function calling program (the JavaScript or HTML link). Then, in steps 1511 and 1513, in a case in which the token and the digital signature included in the profile download function calling program replied from the web server 30 in step 1509 are equal to the token generated by the UE 10 in step 1501 and an expected digital signature, the UE 10 may regard that the corresponding profile download function calling is the calling from the valid web server 30, and may perform the profile download function. In addition, in a case in which the verification of the token fails, as described with reference to FIG. 13, in step 1515, the UE 10 may wait for a certain period of time in order to additionally receive the token.

In the embodiment of FIG. 15, the reply of the web server 30 in step 1509 may selectively include at least one of the token and the digital signature. In addition, each or both of the digital certificate and the signature generation algorithm used in generating the digital signature may be included in the reply of the web server 30, may be exchanged in a message exchange process between the UE and the web server 30 of the previous step, may be shared by a separate communication channel, or may be previously stored in the UE.

Figure 16:
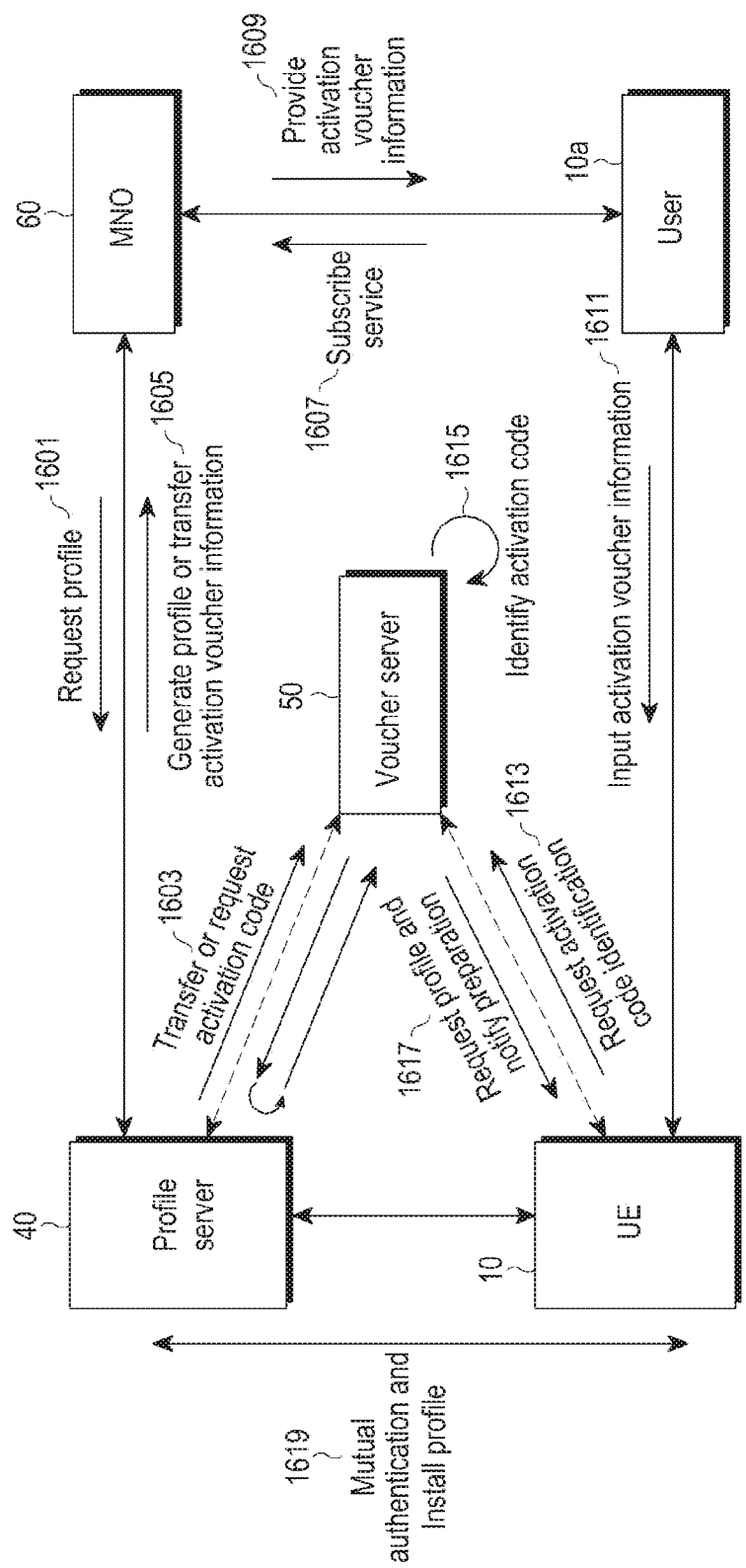
FIG. 16 is a diagram illustrating a procedure in which the UE downloads the profile using a profile download voucher according to an embodiment of the present disclosure.

FIG. 16 is a diagram illustrating a procedure in which the UE downloads the profile using the profile download voucher according to an embodiment of the present disclosure.

Referring to FIG. 16, in step 1601, a communication operator (MNO) 60 requests at least one profile to a profile server 40. The profile request of the MNO 60 may include a bundle request of a plurality of profiles in bulk before a service subscription of users, and the communication operator (MNO) 60 may be a server of the communication operator. In step 1603, in a case in which the profile server 40 requests a generation of an activation code for the profile to be generated to a voucher server 50 or the profile server 40 directly generates the activation code, the profile server 40 transfers the generated activation code to the voucher server 50. The activation code is unique code information corresponding to the profile, and may identify, based on the activation code, whether the profile download request (step 1613 which will be described later) of the UE 10 is normal. The voucher server 50 may be the web server 30 in the examples of FIGS. 4 to 15, and the UE 10 may obtain the address of the voucher server 50 using the eSIM server 20 of FIGS. 5 to 9. In step 1605, the profile server 40 provides one or more profiles generated according to the request in step 1601 and activation voucher information for each of the one or more profiles to the MNO 60. For example, the activation voucher information includes at least one of the activation code of the profile and the address of the voucher server 50 identifying the activation code. Then, in step 1607, in a case in which a communication service subscription of a user 10*a* is present, in step 1609, the MNO 60 provides the activation voucher information in order to enable the user 10*a* to use the communication service. The user 10*a* may be the UE 10 of the user or another UE of the user. For example, the user 10*a* may receive the activation voucher information as a card type in offline state.

In step 1611, the UE 10 receives the activation voucher information, and in step 1613, the UE 10 requests an identification of a corresponding activation code to the voucher server 50. In step 1615, the voucher server 50 identifies the activation code received from the UE 10. In a case of a normal activation code, in step 1617, the voucher server 50 request the preparation of the profile to the profile server 40 and receives profile download related information (e.g., identification information (event ID) of the profile), and transfers, to the UE 10, a message notifying the completion of the profile download request process, the identification information (e.g., address information (DPID)) of the profile server 40, and the profile download related information (e.g., the identification information (event ID) of the profile). Then, in step 1619, the UE 10 connects to the profile server 40, performs a mutual authentication, and then downloads the profile. As another example, the profile server 40 receiving the profile preparation request of step 1617 may directly transmit the profile to the UE 10.

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device (e.g., terminal or server). The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements. Although the above embodiments have been separately described herein, two or more of them may be implemented in combination.

Further, the above embodiments of the present disclosure may be implemented by a computer-readable code in a computer-readable recording medium. The computer-readable recording medium may be any data storage device capable of storing data which can be read by a computer system. Examples of record-mediums readable by the computer may include a Read-Only Memory (ROM), a Random-Access Memory (RAM), a Compact Disc-Read Only Memory (CD-ROM), magnetic tapes, floppy disks, optical data storage devices, carrier waves (such as data transmission through the Internet). Further, functional programs, codes and code segments for achieving the present disclosure may be easily interpreted by programmers skilled in the art which the present disclosure pertains to.

It will be appreciated that an apparatus and a device according to embodiments of the present disclosure can be implemented in a form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the software may be stored in a machine (for example, a computer)-readable storage medium. It will be appreciated that the method according to the embodiments of FIGS. 4 to 15 may be implemented by a computer, various portable terminals, or a network entity managed by a communication provider in a wireless communication system, which includes/include a communication interface such as a transceiver, a controller, and a memory, and the memory is an example of a machine-readable storage medium that is suitable to store a program or programs including instructions for implementing the embodiments of the present disclosure.

Accordingly, the present disclosure includes a program for a code implementing the apparatus and method described in the appended claims of the specification and a machine (a computer or the like)-readable storage medium for storing the program.

Although the embodiment has been described in the detailed description of the present disclosure, the present disclosure may be modified in various forms without departing from the scope of the present disclosure. Thus, the scope of the present disclosure shall not be determined merely based on the described exemplary embodiments and rather determined based on the accompanying claims and the equivalents thereto.

The invention claimed is:

1. A method of downloading a profile by a user equipment (UE) in a communication system, the method comprising:
    transmitting, to an enhanced subscriber identity module (eSIM) server, server type information for identifying a web server processing a download request of the profile between the UE and a profile server which provides the profile;
    receiving, from the eSIM server, address information of the web server;
    transmitting, based on the address information, to the web server, second information to initiate a call, in the web server, for a profile download function of the UE, wherein the profile download function of the UE is related to a download of the profile, and wherein the second information comprises a local profile assistant (LPA) token, an identifier for an embedded universal integrated circuit card (eUICC) of the UE, information on a name of an application installed in the UE to download the profile and LPA calling information, wherein the application is for control of the eUICC, and wherein the LPA calling information indicates information on a name of a function included in the application;
    in response to the second information, receiving, from the web server, profile related information and a response of the LPA token; and
    downloading, based on the profile related information, the profile by connecting to the profile server,
    wherein the web server is different from the profile server including at least one of subscription manager secure routing (SM-SR) or subscription manager data preparation (SM-DP).

2. The method of claim 1, wherein the profile related information includes at least one of identification information of the profile server and identification information of the profile.

3. The method of claim 1, further comprising:
    transmitting token information for verifying validity of the web server, and verifying the web server by receiving information corresponding to the token information from the web server.

4. The method of claim 1, wherein the address information of the web server is received using at least one of a hypertext transfer protocol (HTTP) redirection message, a hypertext markup language (HTML) link, or a javascript object notation (JSON) message.

5. The method of claim 4, further comprising:
receiving a list of a plurality of web servers by the HTML link, in a case in which the web server is capable of being selected among the plurality of web servers; and
selecting, based on the list of the plurality of web servers, the web server.

6. The method of claim 4, wherein the HTML link includes information for a function calling of an application related to the download of the profile.

7. The method of claim 6, further comprising:
determining whether the function calling of the application fails using a timer.

8. The method of claim 6, wherein the information for the function calling further comprises digital signature information for identifying whether the web server is a valid server for the function calling.

9. A user equipment (UE) for downloading a profile in a communication system, the UE comprising:
a communication circuitry configured to transmit and receive a signal;
a universal integrated circuit card (UICC) for a download and an installation of the profile; and
at least one processor configured to:
control to transmit, to an enhanced subscriber identity module (eSIM) server, server type information for identifying a web server processing a download request of the profile between the UE and a profile server which provides the profile,
control to receive, from the eSIM server, address information of the web server,
transmit, based on the address information, to the web server, second information to initiate a call, in the web server, for a profile download function of the UE, wherein the profile download function of the UE is related to a download of the profile, and wherein the second information comprises a local profile assistant (LPA) token, an identifier for an embedded universal integrated circuit card (eUICC) of the UE, information on a name of an application installed in the UE to download the profile and LPA calling information, wherein the application is for control of the eUICC, and wherein the LPA calling information indicates information on a name of a function included in the application,
in response to the second information, receive, from the web server, profile related information and a response of the LPA token, and
download, based on the profile related information, the profile by connecting to a profile server providing the profile,
wherein the web server is different from the profile server including at least one of subscription manager secure routing (SM-SR) or subscription manager data preparation (SM-DP).

10. A method of processing a download request of a profile by a web server in a communication system, the method comprising:
receiving, from a user equipment (UE), first information to initiate a call, in the web server, for a profile download function of the UE, wherein the profile download function of the UE is related to a download of the profile, and wherein the first information comprises a local profile assistant (LPA) token, an identifier for an embedded universal integrated circuit card (eUICC) of the UE, information on a name of an application installed in the UE to download the profile and LPA calling information, wherein the application is for control of the eUICC, and wherein the LPA calling information indicates information on a name of a function included in the application; and
transmitting, to the UE, a response of the LPA token and profile related information including at least one of identification information of a profile server capable of downloading the profile and identification information of the profile in response to the reception of the first information, by the web server,
wherein server type information for identifying the web server is transmitted from the UE to an enhanced subscriber identity module (eSIM) server,
wherein the web server processes the download request of the profile between the UE and the profile server which provides the profile,
wherein address information of the web server is transmitted from the eSIM server to the UE, and
wherein the web server is different from the profile server including at least one of subscription manager secure routing (SM-SR) or subscription manager data preparation (SM-DP).

11. The method of claim 10, further comprising:
receiving, from the UE, token information for verifying validity of the web server, and transmitting, to the UE, information corresponding to the token information.

12. The method of claim 10, wherein the address information of the web server is provided to the UE using at least one of a hypertext transfer protocol (HTTP) redirection message, a hypertext markup language (HTML) link, and a javascript object notation (JSON) message.

13. A web server processing a download request of a profile in a communication system, the web server comprising:
a communication circuitry configured to transmit and receive a signal; and
at least one processor configured to:
control to receive, from a user equipment (UE), first information to initiate a call, in the web server, for a profile download function of the UE, wherein the profile download function of the UE is related to a download of the profile, wherein the first information comprises a local profile assistant (LPA) token, an identifier for an embedded universal integrated circuit card (eUICC) of the UE, information on a name of an application installed in the UE to download the profile and LPA calling information, wherein the application is for control of the eUICC, and wherein the LPA calling information indicates information on a name of a function included in the application, and
transmit, to the UE, a response of the LPA token and profile related information including at least one of identification information of a profile server capable of downloading the profile and identification information of the profile in response to the reception of the first information,
wherein server type information for identifying the web server is transmitted from the UE to an enhanced subscriber identity module (eSIM) server,
wherein the web server processes the download request of the profile between the UE and the profile server which provides the profile,
wherein address information of the web server is transmitted from the eSIM server to the UE, and
wherein the web server is different from the profile server including at least one of subscription manager secure routing (SM-SR) or subscription manager data preparation (SM-DP).

14. The UE of claim 9, wherein the profile related information includes at least one of identification information (DPID) of the profile server and identification information (event ID) of the profile.

15. The UE of claim 9, wherein the at least one processor is further configured to transmit token information for:
   verifying validity of the web server; and
   verifying the web server by receiving information corresponding to the token information from the web server.

16. The UE of claim 9, wherein the address information of the web server is received using at least one of a hypertext transfer protocol (HTTP) redirection message, a hypertext markup language (HTML) link, and a javascript object notation (JSON) message.

17. The UE of claim 16, wherein the at least one processor is further configured to:
   receive a list of a plurality of web servers by the HTML link, in a case in which the web server is capable of being selected among the plurality of web servers; and
   select, based on the list of the plurality of web servers, the web server.

18. The UE of claim 16, wherein the HTML link includes information for a function calling of an application related to the download of the profile.

* * * * *